(12) United States Patent
Kalyanraman et al.

(10) Patent No.: US 12,601,250 B2
(45) Date of Patent: Apr. 14, 2026

(54) MONITORING A WELL BARRIER

(71) Applicant: Schlumberger Technology Corporation, Sugar Land, TX (US)

(72) Inventors: Ram Sunder Kalyanraman, Houston, TX (US); Sebastien Roche, Paris (FR); Claude Signer, Paris (FR); Guillaume Borrel, Paris (FR); Thomas Barrou, Clamart (FR); Jean-Luc Le Calvez, Clamart (FR); Bo Ding, Sugar Land, TX (US); Vassilis Varveropoulos, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1057 days.

(21) Appl. No.: 17/753,488

(22) PCT Filed: Sep. 4, 2020

(86) PCT No.: PCT/US2020/049449
§ 371 (c)(1),
(2) Date: Mar. 4, 2022

(87) PCT Pub. No.: WO2021/046380
PCT Pub. Date: Mar. 11, 2021

(65) Prior Publication Data
US 2022/0333477 A1 Oct. 20, 2022

Related U.S. Application Data

(60) Provisional application No. 62/925,980, filed on Oct. 25, 2019, provisional application No. 62/895,755, filed on Sep. 4, 2019.

(51) Int. Cl.
| | |
|---|---|
| *E21B 47/005* | (2012.01) |
| *E21B 44/00* | (2006.01) |
| *E21B 47/14* | (2006.01) |
| *E21B 47/16* | (2006.01) |
| *G01V 1/50* | (2006.01) |

(52) U.S. Cl.
CPC ............ *E21B 47/005* (2020.05); *E21B 44/00* (2013.01); *E21B 47/14* (2013.01); *E21B 47/16* (2013.01); *E21B 2200/20* (2020.05); *G01V 1/50* (2013.01)

(58) Field of Classification Search
CPC ........ E21B 47/005; E21B 44/00; E21B 47/14; E21B 47/16; E21B 2200/20; G01V 1/50
See application file for complete search history.

(56) References Cited

U.S. PATENT DOCUMENTS

| | | |
|---|---|---|
| 6,012,017 A | 1/2000 | Van Bemmel et al. |
| 6,549,854 B1 | 4/2003 | Malinverno et al. |

(Continued)

FOREIGN PATENT DOCUMENTS

| | | |
|---|---|---|
| CN | 110045417 A | 7/2019 |
| WO | 2016134018 A2 | 8/2016 |

(Continued)

OTHER PUBLICATIONS

Communication Pursuant to Article 94(3) EPC issued in EP Application 20781136.5 dated Feb. 15, 2023, 5 pages.

(Continued)

*Primary Examiner* — Rehana Perveen
*Assistant Examiner* — John P Hocker
(74) *Attorney, Agent, or Firm* — Kyle R. Miiller

(57) ABSTRACT

A system for wireline service planning and advising includes a receiver, one or more computing system processors, and a transmitter. The receiver is configured to receive, from a user of the system, an objective parameter for interpreting a state of a well barrier. The one or more computing system processors is in communication with the receiver and configured to generate a plurality of candidate services based on the objective parameter and a model of the well barrier, each candidate service specifying sensor data to be acquired using (Continued)

wireline tools, select at least one wireline service from the wireline candidate services based on a selection logic or input by the user, and generate an execution plan specifying operational parameters of the selected wireline service. The transmitter is in communication with the one or more computing system processors and configured to transmit the execution plan to execute the selected wireline service at a wellsite.

23 Claims, 12 Drawing Sheets

(56) References Cited

U.S. PATENT DOCUMENTS

| | | | |
|---|---|---|---|
| 10,119,387 | B2 | 11/2018 | Van Kuijk et al. |
| 10,121,261 | B2 | 11/2018 | Kherroubi et al. |
| 10,203,428 | B2 | 2/2019 | Morton et al. |
| 2009/0168595 | A1 | 7/2009 | Wu et al. |
| 2009/0182541 | A1 | 7/2009 | Crick et al. |
| 2009/0299636 | A1 | 12/2009 | Carnegie et al. |
| 2013/0110483 | A1 | 5/2013 | Chugunov |
| 2014/0129506 | A1 | 5/2014 | Hussain et al. |
| 2014/0214326 | A1* | 7/2014 | Samuel ................ E21B 47/006 |
| | | | 702/11 |
| 2015/0355374 | A1 | 12/2015 | Morton |
| 2016/0245946 | A1 | 8/2016 | Kalyanraman et al. |
| 2016/0356125 | A1 | 12/2016 | Bello et al. |
| 2017/0205388 | A1 | 7/2017 | Thomas |
| 2017/0370191 | A1 | 12/2017 | Fox et al. |
| 2018/0045031 | A1* | 2/2018 | Shaposhnikov ........ E21B 33/14 |
| 2018/0321421 | A1* | 11/2018 | Halabe ................... G01V 11/00 |
| 2019/0025450 | A1 | 1/2019 | Teague |
| 2019/0106982 | A1 | 4/2019 | Willerth |
| 2019/0129057 | A1* | 5/2019 | Fanini ..................... G01V 3/34 |
| 2019/0138995 | A1 | 5/2019 | Currin |
| 2019/0170899 | A1 | 6/2019 | Morton et al. |
| 2019/0171187 | A1 | 6/2019 | Cella |
| 2020/0291772 | A1 | 9/2020 | Thiruvenkatanathan |
| 2020/0370418 | A1 | 11/2020 | Fries et al. |
| 2022/0319240 | A1 | 10/2022 | Ito |

FOREIGN PATENT DOCUMENTS

| | | | |
|---|---|---|---|
| WO | 2016179766 | A1 | 11/2016 |
| WO | 2017074883 | A1 | 5/2017 |
| WO | 2018236495 | A1 | 12/2018 |
| WO | 2019055565 | A1 | 3/2019 |
| WO | 2020112974 | A1 | 6/2020 |
| WO | 2020185918 | A1 | 9/2020 |
| WO | 2021046344 | A1 | 3/2021 |
| WO | 2021046356 | A1 | 3/2021 |
| WO | 2021046366 | A1 | 3/2021 |
| WO | 2021046385 | A1 | 3/2021 |

OTHER PUBLICATIONS

Sharma PV, Environmental and Engineering Geophysics 1997, Cambridge University Press, Chapter 2, Gravity Surveying (pp. 11-64).

Sharma PV, Environmental and Engineering Geophysics 1997, Cambridge University Press, Chapter 4, Seismic Surveys (pp. 112-189).
Office Action issued in U.S. Appl. No. 17/753,486 dated Nov. 22, 2024, 36 pages.
Substantive Exam issued in Saudi Arabia Patent Application No. 522431815 dated Nov. 21, 2023, 12 pages with English translation.
Exam Report issued in UAE Patent Application No. P6000403 dated Oct. 8, 2024, 9 pages.
Communication Pursuant to Article 94(3) EPC issued in EP Application 20775988.7 dated Jan. 26, 2024, 8 pages.
First Exam Report issued in Kuwait Patent Application No. KW/P/2022/000191 received Feb. 22, 2024, 5 pages.
Office Action issued in U.S. Appl. No. 17/753,489 dated Mar. 21, 2024, 38 pages.
Shaposhnikov, P. et al., "Advanced Techniques in Integrated Cement Evaluation", presented at the SPWLA 54th Annual Logging Symposium, New Orleans, Louisiana, U.S.A. 2013, 15 pages.
Hare, J. L. et al., "The 4-D microgravity method for waterflood surveillance: A model study for the Prudhoe Bay Reservoir, Alaska", Geophysics, 1999, 64(1), 78.
Bangerth, W. et al., "An Autonomic Reservoir Framework for the Stochastic Optimization of Well Placement", Cluster Computing, Kluwer Academic Publishers, BO, 2005, 8(4), pp. 255-269.
International Search Report and Written Opinion of International Patent Application No. PCT/US2020/049397 dated Feb. 8, 2021, 16 pages.
International Preliminary Report on Patentability of International Patent Application No. PCT/US2020/049397 dated Mar. 17, 2022, 13 pages.
International Search Report and Written Opinion of International Patent Application No. PCT/US2020/049416 dated Feb. 8, 2021, 21 pages.
International Search Report and Written Opinion of International Patent Application No. PCT/US2020/049416 dated Apr. 28, 2021 , 24 pages.
International Preliminary Report on Patentability of International Patent Application No. PCT/US2020/049416 dated Mar. 17, 2022, 15 pages.
International Search Report and Written Opinion of International Patent Application No. PCT/US2020/049428 dated Dec. 21, 2020, 10 pages.
International Preliminary Report on Patentability of International Patent Application No. PCT/US2020/049428 dated Mar. 17, 2022, 8 pages.
International Search Report and Written Opinion of International Patent Application No. PCT/US2020/049449 dated Nov. 18, 2020, 10 pages.
International Preliminary Report on Patentability of International Patent Application No. PCT/US2020/049449 dated Mar. 17, 2022, 8 pages.
International Search Report and Written Opinion of International Patent Application No. PCT/US2020/049454 dated Dec. 9, 2020 (10 pages).
International Preliminary Report on Patentability of International Patent Application No. PCT/US2020/049454 dated Mar. 17, 2022, 8 pages.
Invitation to pay Additional Fees of International Patent Application PCT/US2020/049416, dated Dec. 17, 2020 (28 pages).

* cited by examiner

100

CUSTOMER INPUTS — 102

SERVICE ADVISOR — 104

GENERATE EXECUTION PLAN — 106

WELLSITE AUTOMATION — 108

DATA ACQUISITION — 110

AUTO INTERPRETATION — 112

MONITORING A WELL BARRIER

CROSS REFERENCE

This application is a national stage entry under 35 U.S.C. § 371 of International Application No. PCT/US2020/049449, entitled "AUTONOMOUS WIRELINE OPERATIONS IN OIL AND GAS FIELDS", filed Sep. 4, 2020, which claims the benefit of U.S. Provisional application No. 62/895,755, entitled "AUTONOMOUS WIRELINE OPERATIONS IN OIL AND GAS FIELDS", filed Sep. 4, 2019 and of U.S. Provisional application No. 62/925,980, entitled "AUTONOMOUS WIRELINE OPERATIONS IN OIL AND GAS FIELDS", filed Oct. 25, 2019, the disclosure of which is hereby incorporated herein by reference.

BACKGROUND

During resource explorations and exploitations such as oil or gas explorations and exploitations, significant planning is conducted to assess different considerations related to the explorations and exploitations operations, such as considerations that affect production at the resource site and/or well integrity. These considerations may include estimates of how much resource is available to begin with, types of equipment and systems needed for site planning, specific equipment configuration parameters that enhance optimal resource extraction, feasibility of extracting the resource given geological data of the resource site, regulatory requirements for safely exploiting the resource, etc. Data associated with the resource or installation can provide experts with information regarding some of the aforementioned considerations.

While capturing data at the resource site with sensors has its own challenges, a major problem faced during oil or gas explorations, for example, is leveraging a plurality of data points from resource site data to more accurately characterize parameters of interest. Of paramount importance is the accuracy of models as this facilitates appropriate parameterizing of equipment at the resource site. If initial models and/or updates to the initial resource models are flawed, it not only leads to a loss of money, but may also lead to non-productive time. Examples of such parameters of interest may include parameters related to well integrity of one or more wellbores.

Moreover, manual processes for acquiring model data and configuring equipment are extremely cumbersome, expensive, and error-prone. Such manual processes often lack real-time or pseudo-real-time dynamic equipment configuration based on updates to the resource model.

Additionally, it is desirable during the initial planning phase to accurately model and test multiple scenarios. This can help determine stability parameters for optimally and safely operating site equipment.

In the context of well integrity, measurements performed at the resource site to monitor well integrity include measurements relative to the well integrity, in order to determine parameters relative to the casing corrosion or the material placed in the annulus between the casing and the wellbore (including). Such parameters may for instance be measured via acoustic tools and may comprise casing thickness, acoustic impedance of the annulus or third interface echo. The objective of well integrity is to monitor a well barrier, for example, the interface between the well and the formation. The barrier generally includes a casing and cement linking the casing to the formation. However, the barrier between the formation and the well may be degraded due to corrosion of the casing or degraded quality of the cement, for instance.

It is desirable in the oil and gas industry to efficiently monitor the barrier (in order to make sure it is not degraded) and act upon the barrier.

BRIEF SUMMARY

The disclosure relates to methods and systems as claimed, for monitoring a well barrier of a wellbore formed in a geological formation at a resource site and/or performing a well integrity service at the resource site. The methods and systems as defined in the claims provide an efficient and flexible manner to monitor the well barrier and/or perform a well integrity service.

According to one embodiment of this disclosure, the well barrier of a wellbore formation can be monitored by using one or more sensors deployed at a resource site to capture sensor data associated with the wellbore. These actions can be autonomously, or semi-autonomously, executed by receiving a wellbore model that includes a plurality of wellbore model parameters, where each wellbore model parameter has at least one wellbore model parameter value and associated uncertainty. Using the wellbore model, one or more computer system processors can be used to identify a well integrity service to perform at the wellbore with a downhole tool, where the well integrity service includes capturing sensor data associated with the well barrier. The one or more computing system processors generate an execution plan, where the execution plan includes at least one operation associated with performing the well integrity service, and controls the operation of one or more equipment at the resource site. The execution plan can be executed at the at the resource site, where it controls the operation of one or more equipment at the resource site, including the downhole tool capturing the sensor data associated with the well barrier. The captured or acquired data can be used to update the wellbore model, including the value and associated uncertainty of one or more of the wellbore model parameters. The updated wellbore model can then be used to determine the state of the well barrier.

The present disclosure also relates to a system for monitoring a well barrier of a wellbore and performing a well integrity service at a resource site. The system includes one or more computing system processors and memory storing instructions that are executable by the one or more computing system processors. The system is configured to receive the wellbore model, where the wellbore model includes one or more wellbore model parameters, each parameter having a value and associated uncertainty. The system generates an execution plan that includes one or more actions to perform at least one well integrity service at the resource site. The well integrity service is based on the wellbore model, and uses one or more sensors deployed in the wellbore to acquire or capture data associated with the well barrier. The sensors can be deployed on one or more equipment at the resource site, including at least one downhole tool. The system executes one or more actions associated with the execution plan, where the actions are at least in part executed at the resource site. The one or more actions include control operations of the one or more equipment deployed at the resource site. The system updates at least one value and associated uncertainty of the one or more wellbore model parameters. The system uses the updated wellbore model to determine the state of the well barrier, which can be graphically displayed on one or more end user terminals.

Other aspects and advantages will be apparent from the following description and the appended claims.

BRIEF DESCRIPTION OF THE DRAWINGS

For a better understanding of the aforementioned embodiments as well as additional embodiments thereof, reference should be made to the Detailed Description below, in conjunction with the following drawings in which like reference numerals refer to corresponding parts throughout the figures.

DETAILED DESCRIPTION

Figure 1:
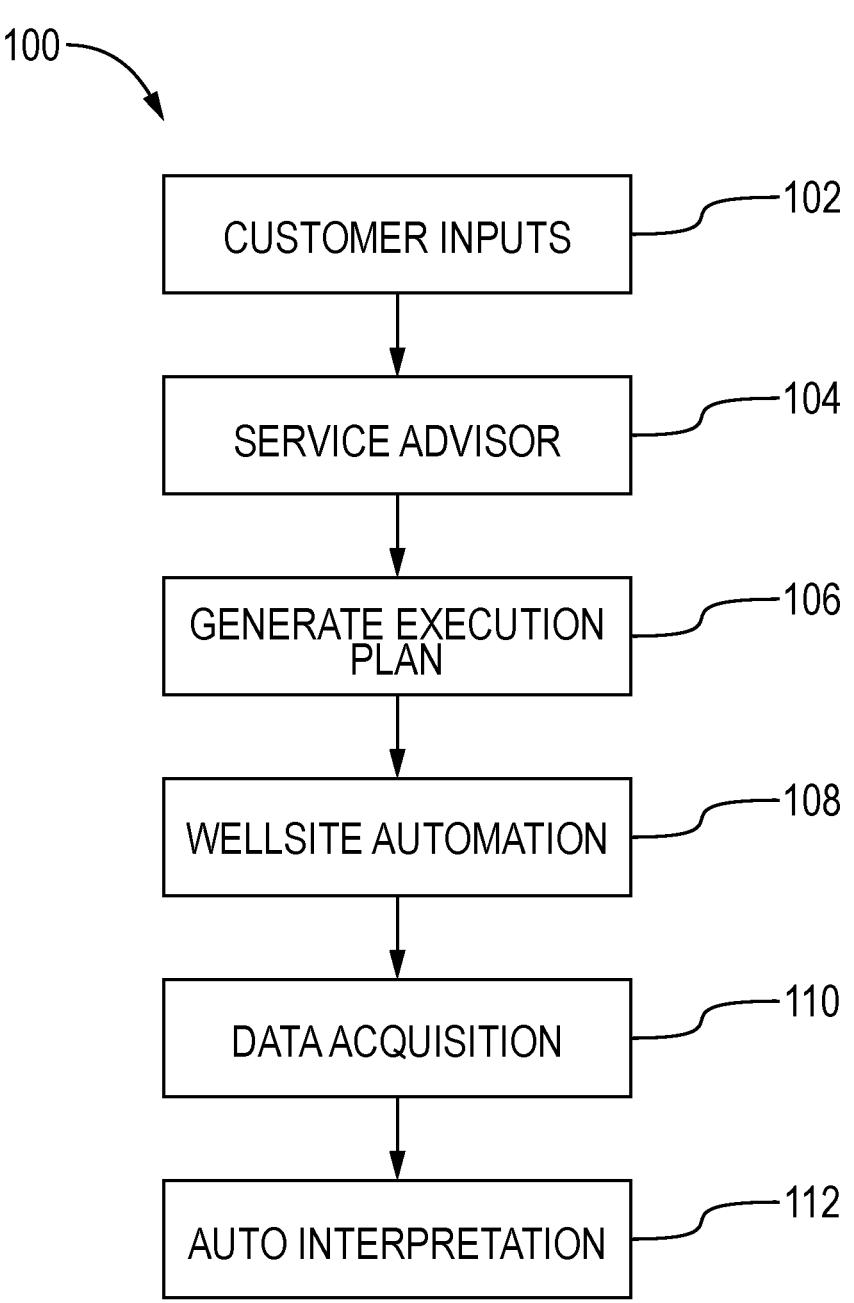
FIG. 1 shows a high-level exemplary wireline process for determining one or more answer products of a subterranean resource such as an oil or gas reservoir.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc., may be used herein to describe various elements, these elements should not be limited by these terms. These terms are used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description herein is for the purpose of describing particular embodiments and is not intended to be limiting. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combination of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

Those with skill in the art will appreciate that while some terms in this disclosure may refer to absolutes, e.g., all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

The systems, methods, processing procedures, techniques and workflows disclosed herein are directed to effective modeling and optimizing processes at resource sites such as oil and gas fields. In some embodiments, various apparatuses and systems leverage a plurality of data associated with a given resource at a well site (such as oil or gas reservoir and/or well) to determine parameters that optimize operations. This may be accomplished using interconnected devices and systems to obtain data associated with parameters of interest and modeling the well site and/or operations based on the obtained data. In some cases, results from the modeling are automatically used to configure equipment as further discussed below. Additionally, the workflows/flowcharts described in this disclosure, according to the some embodiments, implicate a new processing approach (e.g., hardware, special purpose processors, and specially programmed general-purpose processors) because such analyses are too complex and cannot be done by a person in the time available or at all. Thus, the described systems and methods are directed to tangible implementations or solutions to specific technological problems in the oil, gas, and water well industries.

Attention is now directed to methods, techniques, infrastructure, and workflows for wireline operations in oil and gas fields in accordance with some embodiments. Some operations in the processing procedures, methods, techniques, and workflows disclosed herein may be combined and/or the order of some operations may be changed. Some operations in the processing procedures, methods, techniques, and workflows disclosed herein may be combined while the order of some operations may be changed. Some embodiments include an iterative refinement of one or more models via feedback loops executed on an algorithmic basis, such as at a computing device, and/or through user control mechanisms that make determinations regarding whether a given action, template, or model is sufficiently accurate.

High-Level Process Overview

FIG. 1 shows a high-level exemplary wireline process 100 according to the disclosure. The process 100 includes obtaining customer inputs at 102, generating candidate services by a service advisor at 104, generating an execution plan for a selected service at 106, executing, for example autonomously, the execution plan at a resource site (e.g., wellsite, reservoir site, wellbore site, etc.) at 108, conducting data acquisition, for example autonomously using sensors disposed at the wellsite, at 110, and interpreting the acquired data, for example using automatic quality control processes, at 112. According to one embodiment, the exemplary wireline process of FIG. 1 is executed in conjunction with processes of an oil field such as the oil field of FIG. 3 discussed below.

Exemplary Resource Site

As previously noted, the systems and methods presently disclosed may be applicable to exploring subterranean resources such as oil, natural gas, water, and Salar brines. For the purposes of the foregoing, the systems and methods would be applied to oil exploration.

Figure 2A:
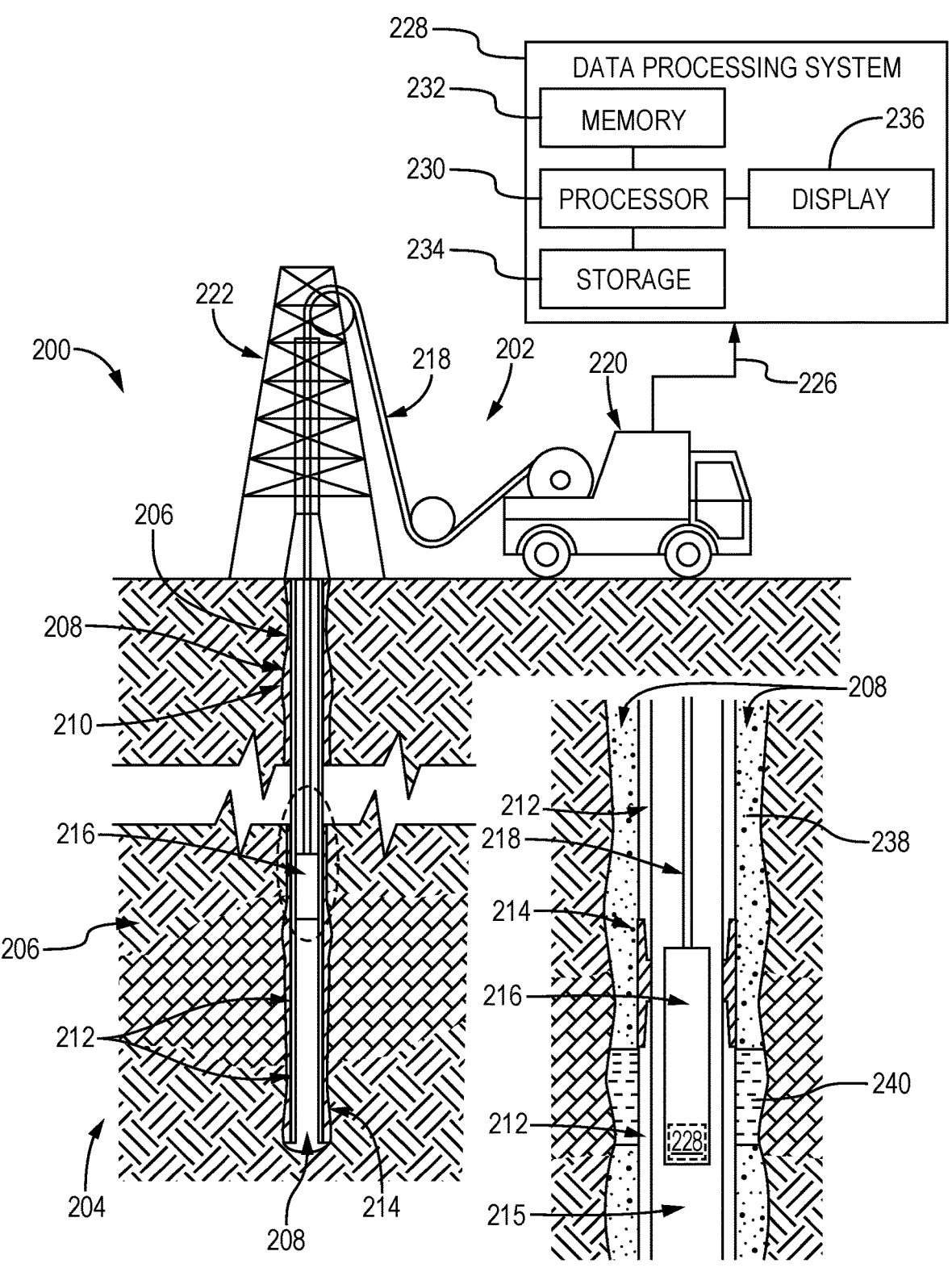
FIG. 2A to 2C shows an exemplary cross-sectional view of an oil field during acoustic logging for which the wireline process of FIG. 1 may be implemented.

FIG. 2A shows a cross-sectional view of an oil field 200 for which the wireline process of FIG. 1 may be implemented. More specifically, FIG. 2A illustrates tools, equipment, and/or systems that may be used for oil exploration or exploitation processes at the oil field 200. Various measurement tools capable of sensing one or more parameters such as seismic two-way travel time, density, resistivity, production rate, etc., of a subterranean formation and/or geological formations of the oil field may be employed. As an example, wireline tools may be used to obtain measurement information related to attributes of the casing or formation. The wireline tool may include a sonic or ultrasonic transducer to provide measurements on casing geometry. The casing geometry information may also be provided by finger caliper sensors that may be included on the wireline tool. In some embodiments, various sensors may be located at various positions along a wellbore at the oil field 200 to monitor and collect data for executing the wireline process of FIG. 1.

FIG. 2A schematically illustrates an example system for evaluating well integrity (i.e., a well barrier), in particular regarding a composition of annulus behind casing in a well. In particular, FIG. 2A illustrates surface equipment 202 above a geological formation 204. In the example of FIG. 2A, a drilling operation has previously been carried out to drill a wellbore 206. In addition, an annular fill 208 has been used to seal an annulus 210—the space between the wellbore 206, casing joints 212, and collars 214—with cementing operations. In some embodiments, the annular fill 208 may include cement, resin, or any other material suitable for filling the annulus 210. As seen in FIG. 1, several casing joints 212 (also referred to below as casing 212) represent lengths of pipe that are coupled together by the casing collars 214 to form a casing string which stabilizes the wellbore 206.

The surface equipment 202 may carry out various well logging operations to detect conditions of the wellbore 16. The well logging operations may measure parameters of the geological formation 204 (e.g., resistivity or porosity) and/or the wellbore 206 (e.g., temperature, pressure, fluid type, or fluid flowrate). Other measurements may provide acoustic cement evaluation and well integrity data (e.g., casing thickness, apparent acoustic impedance, drilling fluid impedance, etc.) that may be used to verify the cement installation and the zonal isolation of the wellbore 206. One or more logging tools 216 conveyed through the wellbore 206 with a cable 218 may obtain some of these measurements. In some embodiments, drilling fluid or mud 215 may be present around the logging tool 216 as it is conveyed in the wellbore 206.

The logging tool 216 may be deployed inside the wellbore 206 by the surface equipment 202, which may include a vehicle 220 and a deploying system. Data related to the geological formation 204 or the wellbore 206 are gathered by the logging tool 216 may be transmitted to the surface. FIG. 2A also schematically illustrates a magnified view of a portion of the cased wellbore 206. The logging tool 216 may acquire data 226 used to evaluate the integrity of the cased wellbore 206. When the acoustic logging tool 216 provides such measurements to the surface equipment 202 (e.g., through the cable 218), the surface equipment 202 may pass the measurements as acoustic data 226 to a data processing system 228 (e.g., a cement evaluation system) that includes a processor 230, memory 232, storage 234, and/or a display 236. In other examples, the data 226 may be processed by a similar data processing system 228 at any other suitable location as will be explained later. For example, in some embodiments, a portion of data processing may be performed by a data processing system 228 at the resource site, and a portion may be processed remotely from the wellsite. This will be explained in details in the next section.

The data processing system 228 may collect the data 226 which may be evaluated to estimate properties associated with the integrity of the wellbore 206, such as a thickness of the casing 212, an apparent acoustic impedance of the annular fill 208, and/or an apparent acoustic impedance of the drilling fluid or mud 215.

Computer facilities (i.e., data processing systems) such as those discussed in association with FIG. 2A may be positioned at various locations about the oil field 200 and/or at remote locations. The data processing system 228 may include one or more terminals (designated for instance terminal 320 in the following) that may be used to communicate with the onsite tools 216 and/or offsite operations, as well as with other surface or downhole sensors. The data processing systems 228 may be capable of sending commands to the oil field equipment/systems (including the acoustic logging tool and surface equipment), and receiving data therefrom. The surface unit may also collect data generated during logging operations and can produce output data, which may be stored or transmitted for further processing.

The data collected by sensors may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis or for modeling purposes to optimize production processes at the oil field 200. In one embodiment, the data is stored in separate databases, or combined into a single database.

In some embodiments, the data 226 from the logging tool 216 may be used to determine the presence of solid cement in the annular fill 208 has been installed as expected. In some cases, the data 226 may be evaluated to determine whether the cement of the annular fill 208 has a generally solid character (e.g., as indicated at numeral 238) and therefore has properly set. In other cases, the data 226 may indicate the potential absence of cement or that the annular fill 208 has a generally liquid or gas character (e.g., as indicated at numeral 240), which may imply that the cement of the annular fill 208 has not properly set. Moreover, in some embodiments, the data 226 may be used to indicate various parameters relating to the wellbore 206, such as parameters of the annular fill 208, the casing 212, and fluid (i.e., drilling fluid, mud) between the casing 212 and the tool 216. For example, when the logging tool is an acoustic tool, the data processing system 228 may be used to estimate or output an estimated thickness of the casing 212, an acoustic impedance of the annular fill 18, and/or an acoustic impedance of the fluid.

In the following, a "well barrier" will designate what separate the wellbore from the formation. Such well barrier includes the casing and the annular fill.

Figure 2B:
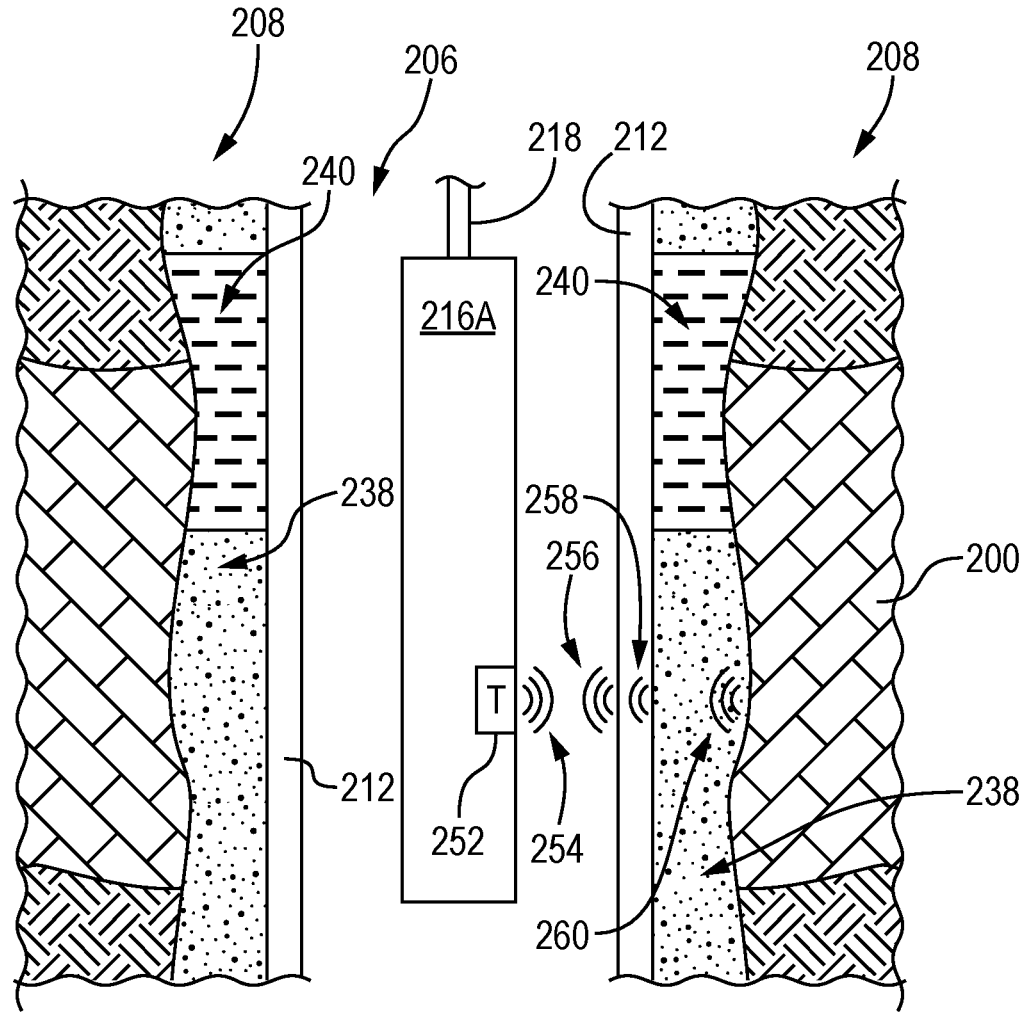
Figure 2C:
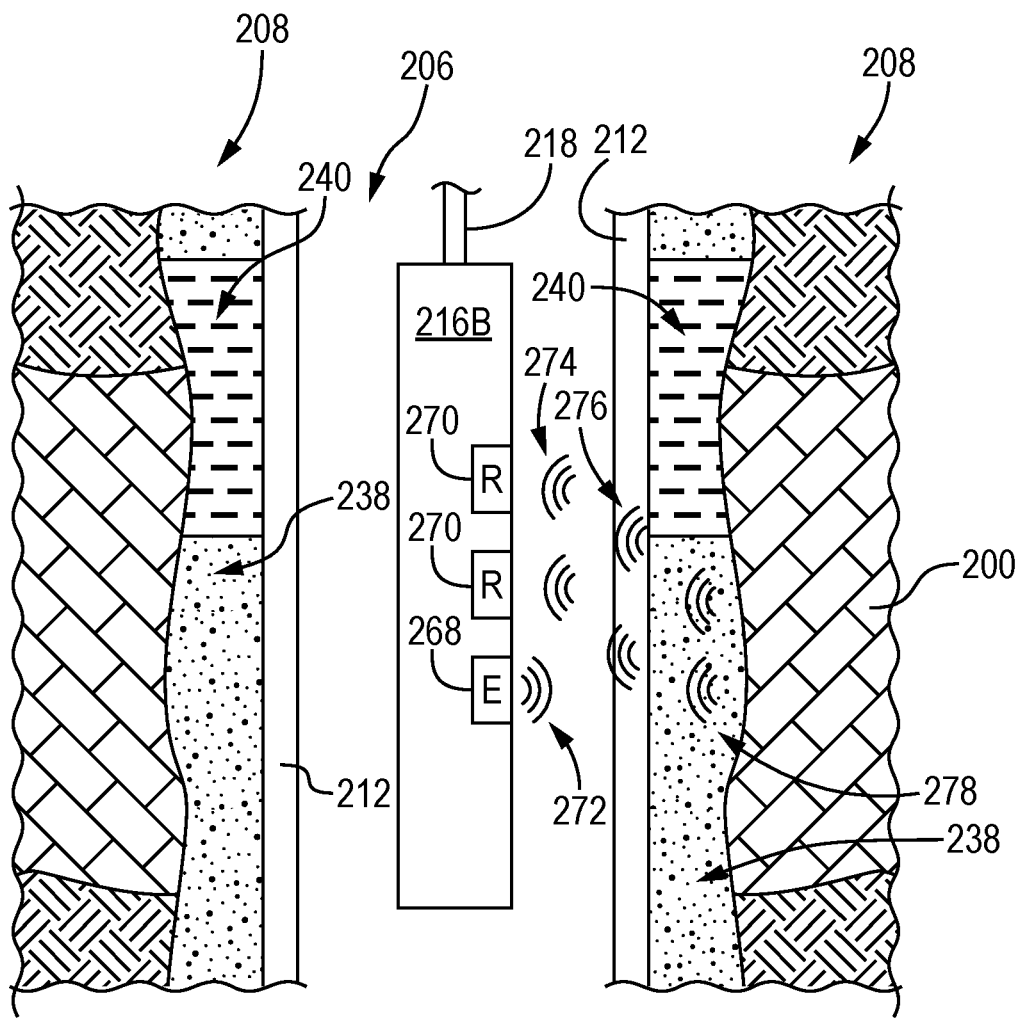

Examples of logging tools 216 include acoustic logging tools that are shown on FIGS. 2B and 2C. Such acoustic logging tools may be, for example, an UltraSonic Imager (USI™) tool and/or an Isolation Scanner™ tool by Schlumberger. The acoustic logging tool 216a may obtain acoustic data 226 to evaluate properties of the cased wellbore 206. For instance, the acoustic logging tool 216 may obtain a pulse echo measurement that exploits the thickness mode (e.g., in the manner of an ultrasonic imaging tool) or may perform a pitch-catch measurement that exploits the casing flexural mode. The ultrasonic pitch-catch technique may be based on exciting and detecting from the casing quasi-Lamb modes with emphasis on the lowest-order anti-symmetric mode (A0) often referred as the flexural mode. The casing flexural mode also radiates elastic energy into the annulus between casing and formation (or between a primary casing and a secondary one as it occurs for multiple string situations). When the annulus is filled with cement, either a shear wave only or both shear and compressional waves may be radiated into the cement layer, depending on the mechanical properties of the cement or annulus material.

With this in mind, FIG. 2B provides a general example of the operation of the acoustic logging tool 216a in the wellbore 206. Specifically, a transducer 252 in the acoustic logging tool 26 may emit acoustic waves 254 out toward the casing 212. Reflected waves 256, 258, and 260 may correspond to interfaces at the casing 212, the annular fill 208, and the geological formation 204 or an outer casing, respectively. The reflected waves 256, 258, and 260 may vary depending on whether the annular fill 208 is of the generally solid character 238 or the generally liquid or gas character 240. The reflected waves 256, 258, and 260 may be received at the same transducer 252 to be processed for cement evaluation. The acoustic logging tool 216a may use any suitable number of different techniques, including measurements of acoustic impedance from sonic waves, ultrasonic waves and/or flexural attenuation. When one or more of these measurements of acoustic cement evaluation data are obtained, they may be integrated and/or processed to determine characteristics of the annular fill 208.

FIG. 2C provides another example embodiment of the acoustic logging tool 216b having an emitter 268 and a pair of receiver transducers 270. The emitter 268 in the acoustic logging tool 216a may emit acoustic energy (i.e., acoustic waves 272) out toward the casing 212 resulting in reflected waves 274, 276, and 278. In the embodiments shown in FIG. 2C, the emitted energy excites a predominantly zeroth-order asymmetric mode (also referred to as flexural mode). As in the embodiment described above, the acoustic waves 272 propagate via transmission into both sides of the wall of the casing 212. The transmission in the casing annulus depends on the material on the outer side of the wall of the casing 212 with a different amount of energy leak inside the annulus. The acoustic logging tool embodiment depicted in FIG. 2C may use measurements of acoustic impedance from flexural attenuation. The different distance from the emitter 268 and the two receiver transducers 270 and the energy leak induce different amplitudes on the measured acoustic pressure.

One or more aspects or embodiments of the present techniques may be applicable to thickness mode, pulse-echo measurements such as those obtained by the tool 216a in FIG. 2B and flexural mode, pitch-catch measurements such as those obtained by the tool 216b in FIG. 2C as well as other type of measurements for determining the well integrity, e.g. the state of the well barrier. For instance, acoustic data 226 may include acoustic waveforms or reflected waves from the casing 212, the annular fill 208, the formation 204, and/or any of the interfaces between mud and the casing 212, annular fill 208, formation 204. The acoustic data 226 may also be referred to as the acoustic waveforms or measured waveforms. Furthermore, even though only acoustic logging tools have been described in detail and will be used as exemplary embodiments in the following, the method described below may be applied to other well integrity tools, such as electromagnetic tools, caliper, etc.

Part, or all, of the oil field 200 may be on land or water. Also, while a single wellbore at a single location is depicted, the technology described herein may be utilized with any combination of one or more resource sites (e.g., multiple oil fields or multiple wellsites), one or more processing facilities, etc.

While a specific well barrier is depicted, it is appreciated that the wellbores may contain a variety of well barriers, sometimes having extreme complexity. Each of the logging tools may be used to measure properties of one the well barriers at the resource site. While each data acquisition tool is shown as being in specific locations in FIG. 2A, it is appreciated that one or more types of measurement may be taken at one or more locations across one or more wellbores 206 in the oil fields 200 or other locations for comparison and/or analysis. The data collected from various sources at the oil field 200 may be processed and/or evaluated and/or incorporated into models and/or used as training data as further discussed below.

Now that examples of tools used within the method have been described, the method will be explained in more details.

High-Level Networked System

Figure 3:
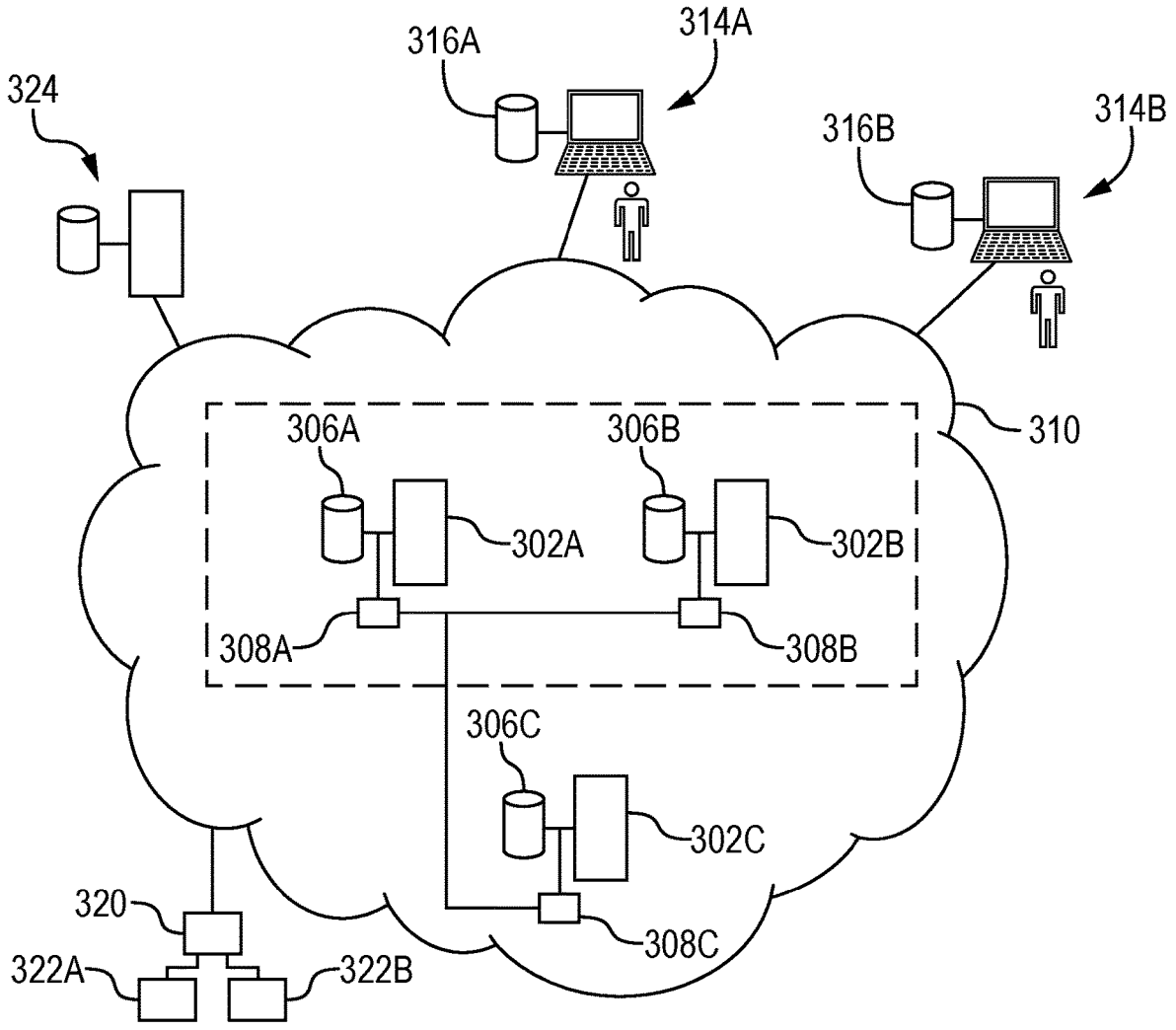
FIG. 3 shows an exemplary high-level networked system diagram illustrating a communicative coupling of devices or systems associated with the oil field of FIG. 2.

FIG. 3 shows an exemplary high-level networked system diagram illustrating a communicative coupling of devices or systems associated with the oil field 200. The system shown in the figure may include one or more computing system processors 302a, 302b, and 302c for executing one or more of the wireline process of FIG. 1. The one or more computing system processors 302 may be electrically coupled to one or more servers (e.g., computing systems) including memory 306a, 306b, and 306c that may store for example, program data, databases, and other forms of data. Each server of the one or more servers may also include one or more communication devices 308a, 308b, and 308c. The set of servers may provide a cloud computing platform 310. In one embodiment, the set of servers includes different computing devices that are situated in different locations and may be scalable based on the needs and workflows associated with the oil field 200. The communication devices of each server may enable the servers to communicate with each other through a local or global network such as an Internet network. In some embodiments, the servers may be arranged as a town, which may provide a private or local cloud service for users. A town may be advantageous in remote locations with poor connectivity. Additionally, a town may be beneficial in scenarios with large networks where security may be of concern. A town in such large network embodiments can facilitate implementation of a private network within such large networks. The town may interface with other towns or a larger cloud network, which may also communicate over public communication links. Note that cloud computing platform 310 may include a private network and/or portions of public networks. In some cases, a cloud computing platform 310 may include remote storage and/or other application processing capabilities.

The system of FIG. 3 may also include one or more user terminals 314a and 314b each including at least a processor to execute programs, a memory (e.g., 316a and 316b) for storing data, a communication device and one or more user interfaces and devices that enable the user to receive, view, and transmit information. In one embodiment, the user terminals 314a and 314b is a computing system having interfaces and devices including keyboards, touchscreens, display screens, speakers, microphones, a mouse, styluses, etc. The user terminals 314 may be communicatively coupled to the one or more servers of the cloud computing platform 310. The user terminals 314 may be client terminals or expert terminals, enabling collaboration between clients and experts through the system of FIG. 3.

The system of FIG. 3 may also include at least one or more oil fields 200 having, for example, a set of terminals 320 (i.e. data processing system 28 as described in FIG. 2A), each including at least a processor, a memory, a communication device for communicating with other devices communicatively coupled to the cloud computing platform 310. The oil field 200 may also have one or more sensors (e.g., one or more sensors described in association with FIG. 2) or sensor interfaces 322a and 322b communicatively coupled to the set of terminals 320 and/or directly coupled to the cloud computing platform 310. In some exemplary embodiments, data collected by the one or more sensors/sensor interfaces 322a and 322b (such as downhole tool 216) may be processed to generate a one or more models which may be displayed on a user interface associated with the set of terminals 320, and/or displayed on user interfaces associated with the set of servers of the cloud computing platform 310, and/or displayed on user interfaces of the user terminals 314. In some implementations, the one or more models that can simulate a wellbore. Furthermore, various equipment/devices discussed in association with the oil field 200 may also be communicatively coupled to the set of terminals 320 and or communicatively coupled directly to the cloud computing platform 310. The equipment and sensors may also include one or more communication device(s) that may communicate with the set of terminals 320 to receive orders/instructions locally and/or remotely from the oil field 200 and also send statuses/updates to other terminals such as the user terminals 314.

The system of FIG. 3 may also include one or more client servers 324 including a processor, memory and communication device. For communication purposes, the client servers 324 may be communicatively coupled to the cloud computing platform 310, and/or to the user terminals 314a and 314b, and/or to the set of terminals 320 at the oil field 200 and/or to sensors at the oil field, and/or to other equipment at the oil field.

A processor, as discussed with reference to the system of FIG. 3, may include a microprocessor, microcontroller, processor module or subsystem, programmable integrated circuit, programmable gate array, or another control or computing device.

The memory/storage media mentioned above can be implemented as one or more computer-readable or machine-readable storage media that are non-transitory. In some embodiments, storage media may be distributed within and/or across multiple internal and/or external enclosures of a computing system and/or additional computing systems. Storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), BluRays or any other type of optical media; or other types of storage devices. "Non-transitory" computer readable medium refers to the medium itself (i.e., tangible, not a signal) and not data storage persistency (e.g., RAM vs. ROM).

Note that instructions can be provided on one computer-readable or machine-readable storage medium, or alternatively, can be provided on multiple computer-readable or machine-readable storage media distributed in a large system having possibly plural nodes and/or non-transitory storage means. Such computer-readable or machine-readable storage medium or media is (are) considered to be part of an article (or article of manufacture). The storage medium or media can be located either in a computer system running the machine-readable instructions, or located at a remote site from which machine-readable instructions can be downloaded over a network for execution.

It is appreciated that the described system of FIG. 3 is an example that may have more or fewer components than shown, may combine additional components, and/or may have a different configuration or arrangement of the components. The various components shown may be implemented in hardware, software, or a combination of both, hardware and software, including one or more signal processing and/or application specific integrated circuits.

Further, the steps in the flowcharts described below may be implemented by running one or more functional modules in information processing apparatus such as general-purpose processors or application specific chips, such as ASICs, FPGAs, PLDs, or other appropriate devices associated with the system of FIG. 3. These modules, combinations of these modules, and/or their combination with general hardware are included within the scope of protection of the disclosure.

In some embodiments, a computing system is provided that includes at least one processor, at least one memory, and one or more programs stored in the at least one memory, such that the programs comprise instructions, which when executed by the at least one processor, are configured to perform any method disclosed herein.

In some embodiments, a computer readable storage medium is provided, which has stored therein one or more programs, the one or more programs including instructions, which when executed by a processor, cause the processor to perform any method disclosed herein. In some embodiments, a computing system is provided that includes at least one processor, at least one memory, and one or more programs stored in the at least one memory for performing any method disclosed herein. In some embodiments, an information processing apparatus for use in a computing system is provided for performing any method disclosed herein.

Detailed Process Workflow

Figure 4A:
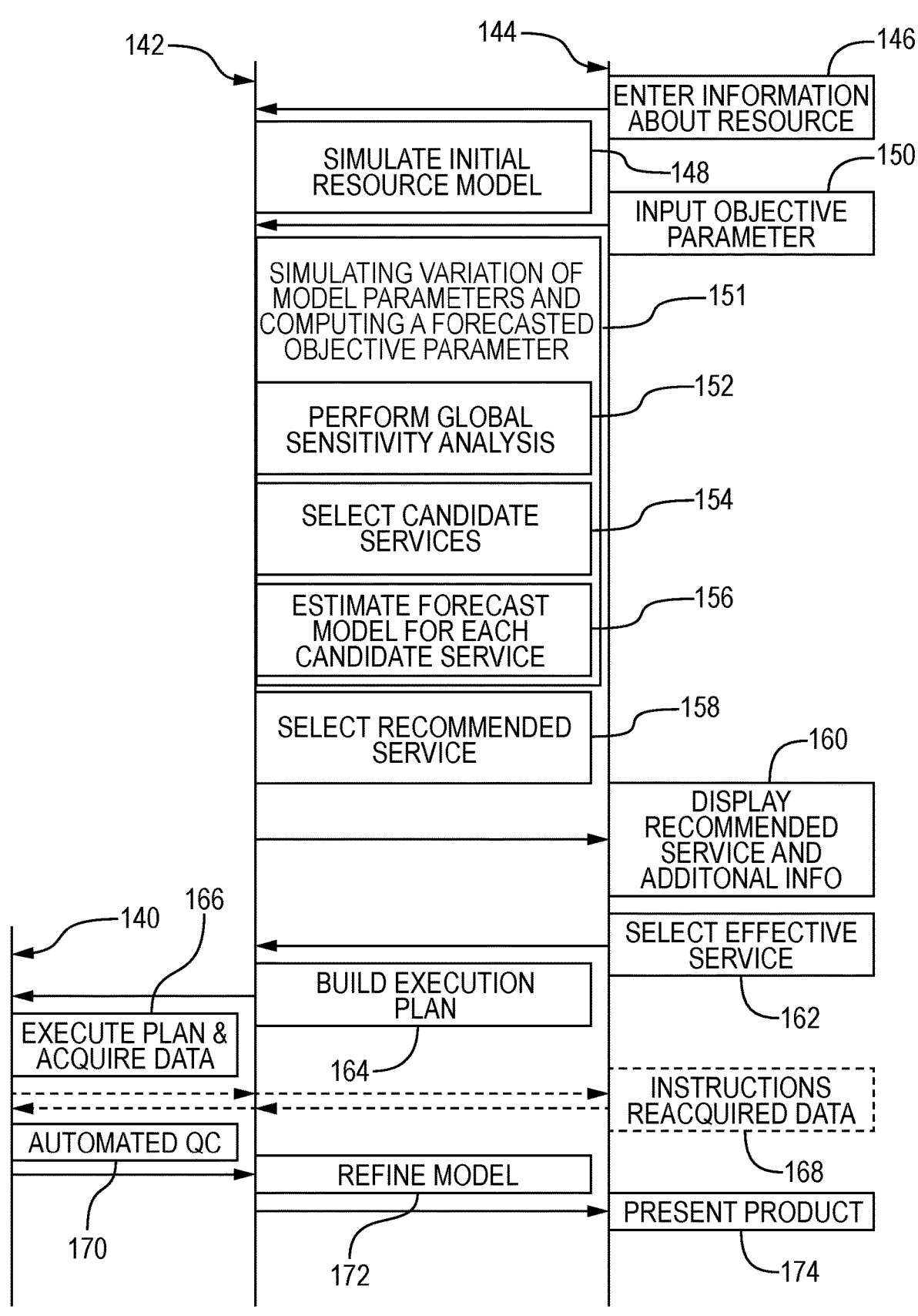
FIG. 4A illustrates an exemplary interaction of a user with the system of FIG. 3, FIG. 4B provides further details and more context to the processes described above in conjunction with FIG. 4A.

FIG. 4A illustrates an exemplary interaction of a user with the system of FIG. 3. As will be realized shortly, this user interaction, according to some embodiments, is based on the wireline process 100 of FIG. 1.

As seen in the FIG. 4A, Column 140 represents the location of the oil field 200. Column 142 represents services provided by the cloud computing platform 310 while column 144 represents a user or a customer interface.

At operation 146, the user/customer inputs information about the oil field 200, such as information relative to one or more wellbores and/or well barriers. This input may be transmitted to the cloud computing platform 310. When the user is interested in well integrity, the information that are inputted may relate to the wellbore profile (including wellbore geometry or wellbore deviation), completion profile (including casing positions, diameters and thicknesses), the borehole fluid properties such as composition, density, slowness etc., the annulus properties, in particular the material situated in the annulus and recent wellbore operations that happened in the wellbore. According to some implementations, the customer inputs may include parameters/parameter values derived from historical or real-time data associated with the oil field 200. As will be further discussed below, the customer inputs may be used to generate an initial model characterizing a wellbore and/or a well barrier at the oil field 200 in order to initiate operations and/or simulate operations for actual operations at the oil field 200.

At operation 148, a cloud-based processing/computing system generates the initial model based on the user inputs, which may be a wellbore model, based on the information provided by the user. For example, a model may be parameterized based on known information or information from models similar to the identified resource.

At operation 150, the user may input a parameter of interest as an objective parameter. The objective parameter is generally a function of one or more wellbore parameters. When the user is interested in well integrity, the parameter of interest may be related to the state of the barrier, such as material in the wellbore annulus or casing corrosion, for instance. In some implementations, the value and associated uncertainty of the objective parameter may be estimated based on the model. As will be described below, a well integrity service of interest (i.e., that will have an influence on the objective parameter) is identified based on the wellbore model and on the objective parameter. In particular, identifying the at least one well integrity service includes simulating variation of the value and/or uncertainty of at least one of the wellbore model parameters according to one or more scenarios, and computing a forecasted objective parameter value and/or forecasted objective parameter uncertainty associated with each scenario 151. The at least one well integrity service is identified based on the forecasted objective parameter value and/or forecasted uncertainty associated with each scenario.

The method of FIG. 4A discloses one embodiment of identifying the well integrity service. In this embodiment, sensitivity data regarding the respective contributions of the wellbore model parameters to the objective parameter are determined (by performing a global sensitivity analysis at operation 152) and one or more target model parameters are identified based on the sensitivity data. A plurality of candidate services are identified at operation 154 based on the target model parameters. Then, the method includes simulating the variation of the wellbore parameter values and/or uncertainties according to a second subset of scenarios (at operation 156). Each scenario of the second subset is representative of performance of one of the candidate service, and the simulation according to said scenario includes incorporating data representative of the performance into the wellbore model. The at least one well integrity service is then identified based at least on the forecasted objective parameter values and/or uncertainties associated with the second subset of scenarios (at operations 158-162). This embodiment is described in more details below.

At operation 152, the cloud based processing system performs a global sensitivity analysis. In one embodiment, the global sensitivity analysis includes performing one or more simulations/tests based on a plurality of different values of the plurality of parameters that characterize the model. For example, the one or more simulations could be performed to test the viability of a process to be executed at the oil field 200, and/or to test safety measures to be implemented at the oil field 200. In any case, the simulations, according to some implementations, can facilitate pre-site (e.g., pre-well) planning processes/procedures before executing such processes and/or procedures at the oil field 200. In some instances, if a set of parameters associated with the model have certain degrees of uncertainty values or certain introduced measurement errors and/or manual errors, the simulations may be adapted by varying one or more values associated with the plurality of the parameters within specific ranges (e.g., range of possible values of a parameter that lead to optimum simulation results aligned with customer/client objectives). In some cases, the simulations may be performed based on the model. The global sensitivity analysis is performed so that the sensitivity of the objective parameter to one or more other parameters of the model is determined and target model parameters having high contribution to the objective parameter (in particular objective parameter uncertainty are identified). More information regarding the global sensitivity analysis are provided separately.

At operation 154, the simulation results or sensitivity data from the global sensitivity analysis performed at operation 152 may be analyzed to identify and/or select one or more candidate services and/operations and/or tasks that most closely align with the objective parameter inputted by the user at operation 150, in particular that contribute in reducing the uncertainty of the objective parameter. It is appreciated that a candidate/recommended service according to some implementations, includes tasks such as acquiring data from a resource using one or more downhole sensors having a parametrization, such that the parametrization optionally includes a voltage, a gain, a processing time window, an intensity, and a processing filter.

Of a plurality of simulations based on the model from operation 152, one or more parameters (e.g., resource parameters) associated with the model whose variance and/or error ranges contribute to uncertainty (e.g., uncertainty value) and/or undesirable realization of the objective parameter may be identified at operation 154 and subsequently modified to comply with or minimize the uncertainty and/or a desired/optimum realization of the objective parameter. In some embodiments, an optimum realization of the objective parameter may comprise minimizing one or more uncertainty values associated with the objective parameter.

At operation 156, a forecast model estimating the effect of selecting a given candidate service from the one or more candidate services may be executed. This corresponds to simulating variation of wellbore model parameters in response to a scenario associated with the given candidate service. In some embodiments, estimating the effect of selecting a given candidate service may comprise generating and ascribing updated values for one or more parameter of the model and associated certainty due to the performance of one or more candidate services, computing updated objective and uncertainty values for the objective parameter and ranking the candidate service in particular based on the reduction of uncertainty values of the objective parameter.

According to some implementations, the simulation and/or the forecast models may take into account one or more of accuracy, calibration and/or reliability of one or more sensors/equipment at oil field 200. Indeed, the simulation may be based on one or more equipment models representative of the equipment at the resource site, including the downhole tool for performing the candidate service. The equipment model takes into account one or more equipment parameters representative of one or more of accuracy, calibration and/or reliability of the equipment.

In some embodiments, highly ranked services within the one or more candidate services may be provided to a user via a user interface.

At operation 158, one or more recommended services from the candidate services generated may be presented to a user. According to some implementations, one or more recommended services may be presented at operation 158 for selection by a user with varying degrees of approximation of the requirements of the objective parameter (in particular reduction of uncertainty of the objective parameter). In other embodiments, an optimal recommended service may be automatically generated that best approximates/ closely approximates the requirements of the objective parameter (i.e., the service that enables the greatest reduction of uncertainty of the objective parameter).

At operation 160, one or more recommended services may be communicated to the user and displayed on the user's system (e.g., display device such as tablets, phones, phablets, laptops, monitors, etc.). According to some implementations, the one or more recommended services may be displayed on the user's system (e.g., display device) with additional information including one or more of an indicator of the updated uncertainty of the one or more objective parameters, the price of an effective service within the one or more recommended services, and a description of the effective service. A multi-factor logic may be used to select and/or rank the recommended services.

At operation 162, the user may select a recommended service (e.g., the effective service). In some cases, a user's selection of a recommended service may be communicated to the cloud computing platform 310.

In an alternative embodiment, the user identifies himself the service he would like to perform at the oil field and does not use the Service Advisor as described in operations 150-162. The following operations based on the selected effective service may however still be performed. In other embodiments, the service advisor may identify candidate services from which the user chooses directly (without performing operation 156) and/or does not perform a global sensitivity analysis for selecting a plurality of candidate services (operations 152, 154) but directly runs the forecast models (e.g., simulations) for all of the available services.

At operation 164, the cloud computing platform 310 may generate an execution plan for the selected service and communicate the generated execution plan to the oil field 200 and/or to the user terminal 314. The execution plan includes at least one operation comprised in one or more operations associated with performing the at least one identified service. The one or more operations may include a sequence of actions that control the operation of equipment at the resource site, where the equipment includes at least the downhole tool used to execute the identified service. Each action may be associated with at least one of a success variable and a failure variable. Each action may further be associated with preconditions, which will be described in greater detail below. The execution plan may also comprise one or more models (such as wellbore model, QC model, equipment models) that will enable to guide and/or refine the sequence. When well integrity is the client's concern, the services that are selected may be wireline acoustic services, alone or in combination with other services such as electromagnetic services and/or caliper services. The data that are acquired in relationship with acoustic services (that will be taken as an example in the whole specification) may relate to acoustic waveforms obtained in response to an emitted signal as explained in more details in relationship to FIGS. 2B & 2C. travel time, intensity, spectra, amplitude, etc.

At operation 166, one or more systems and/or equipment at the oil field 200 may execute the execution plan. It includes controlling operation of one or more equipment, including the downhole tool, at the resource site to perform the at least one identified service. In some cases, data may be obtained during executing the execution plan by one or more site systems at the oil field 200. In some embodiments, this data may be captured by sensors or other measuring devices at the oil field 200 in real-time as the execution plan is being implemented. In some embodiments, sensor data measured during the implementation of the execution plan at the oil field 200 is directly relayed in real-time or pseudo-real-time to the cloud computing platform 310/processing platform, which may update the initial model with such information, generate additional forecast models based on the updated initial model, revise the execution plan, and transmit the revised execution plan to the oil field 200 and/or to the user's system during or after the implementation of the execution plan. In some embodiments, the revised execution plan may be substituted for the initial execution plan and subsequently implemented at the oil field 200.

In some embodiments, sensor data captured during implementation of the execution plan and/or revised execution plan at oil field 200 may be transmitted to the user so the user can provide updated inputs/instructions (e.g., at operation 168). The updated instructions, in some embodiments, may include instructions to the cloud computing platform 310 to update the initial model and re-execute operations 152-158 of FIG. 4A. The operation 168 is optional.

At operation 170, the one or more systems associated with the oil field 200 may perform a quality control process based on the acquired sensor data. The automated quality control in an action programmed in the execution plan and outputs that is determined as either acceptable or undesired. It may be performed in relationship with the QC model of the execution plan. The automated quality control is explained in more details below.

The one or more systems associated with the oil field 200 may be local and/or remote to the oil field 200. According to some embodiments, results from the quality control process including measurement data may be transmitted to the cloud computing platform 310, which may refine or update, at operation 172, the resource model (i.e., wellbore model) or the revised execution plan based on the new data as explained in previous paragraph.

Updating the resource model 172 includes updating the value and/or uncertainty of at least one of the wellbore model parameters, thereby updating the wellbore model, based on data acquired at the resource site during the execution of the execution plan. It may include (before or after the quality control, as will be explained below), interpreting the acquired data to compute one or more updated wellbore model parameter values and/or uncertainties as part of the execution plan. When the well integrity service is an acoustic service, examples of interpretation are given later. When the automated data quality control is performed, the at least one wellbore model parameter may be updated when the automated quality control outputs an acceptable state. Updating the wellbore model enables determination of a state of the well barrier.

In some instances, the cloud computing platform 310 may store performance information on equipment used in implementing the execution plan and/or revised execution plan. This performance information may be used to provide models or update models of the equipment for future use. At operation 174, a product and/or service result and/or operation statistics/reports and/or resource production information/reports, etc., may be presented to the user based on the refined model (e.g., model generated from updating the initial model) and the objective parameter. The product may for instance include in this case a state of the well barrier.

The processes outlined in FIG. 4A beneficially allow for error-detection and correction associated with parameters and/or constraints and/or equipment measurements and/or production processes at the oil field 200. For example, and as discussed elsewhere herein, uncertainties associated with parameters and/or constraints can be quantified and/or confirmed using real-time measurements at the oil field based on initial execution plans prior to scaling production operations at the oil field 200. Further, machine learning and/or deep learning, and/or artificial intelligence tools can be used in the interpretation of the acquired data and/or refinement/updating of models to more accurately characterize operations and/or structures at the oil field 200 as further discussed in conjunction with FIG. 4B. For example, simulation tools that may include machine learning or artificial intelligence may be leveraged to simultaneously run tens, hundreds, or thousands of simulations of production processes based on different model parameters to determine models and parameters that satisfy the requirements (in particular required uncertainty) of the objective parameter. Additionally, the processes of FIG. 4A may facilitate automatic and rapid execution of tasks such as logging, and other extraction and information analysis processes at the oil field 200.

Figure 4B:
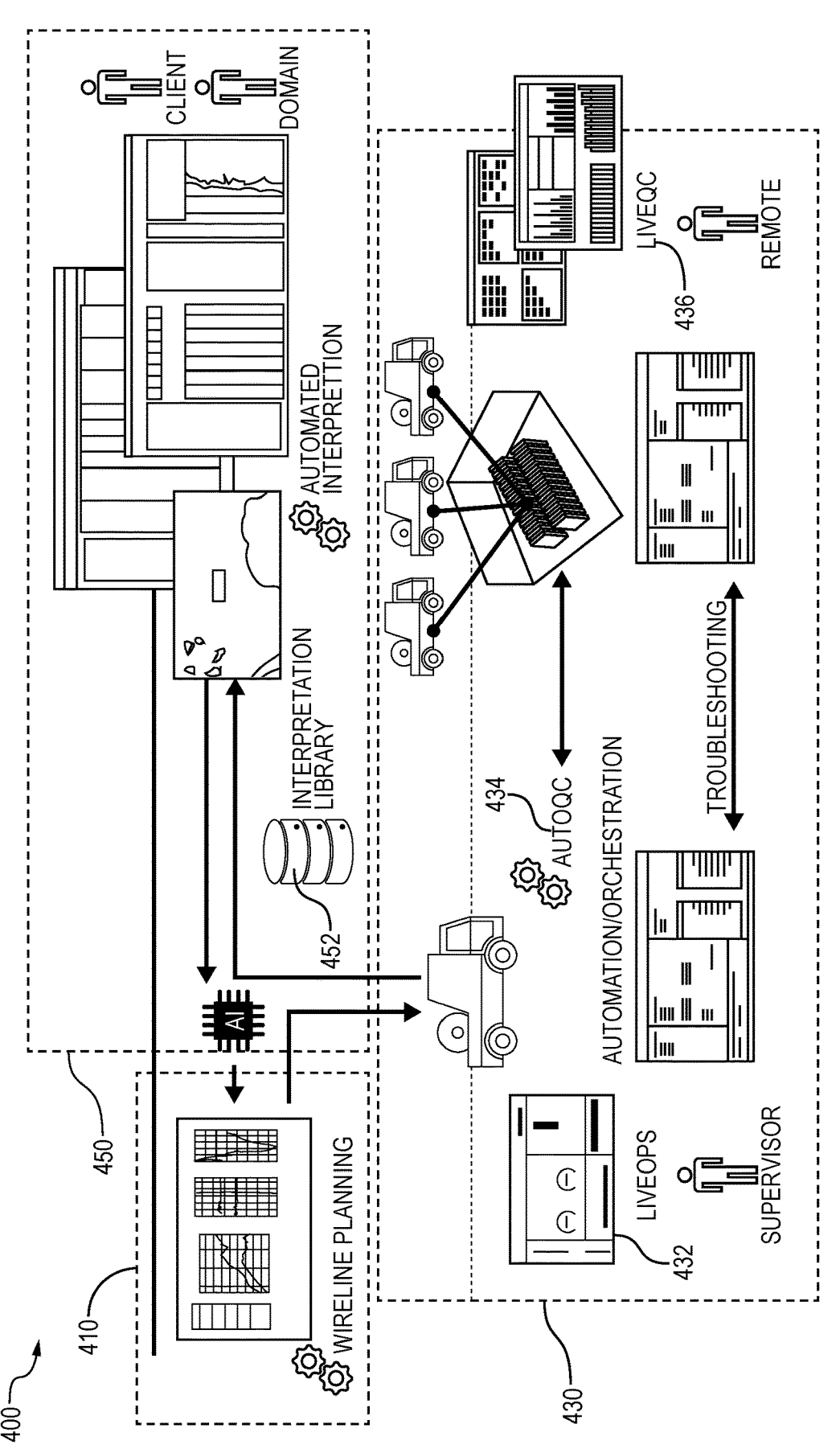

FIG. 4B provides further details and more context to the processes described above in conjunction with FIG. 4A. In an embodiment, system 400 includes three main blocks, components, or modules including a wireline planning module 410, an autonomous execution module 430, and a collaboration, validation, and learning module 450. These modules are for exemplary purposes only, as system 400 may be divided or characterized in other ways, and its modules may vary based on different domains (here, well integrity), applications, and contexts. Each of the modules may be implemented by one or more computing system processors and based on interaction with other elements of the system of FIG. 3. For instance, in the wireline planning module, one or more computing system processors can communicate with a user terminal of one or more user terminals 314 and/or with a client server 324. In the autonomous execution module, the one or more computing system processors handles operation in coordination with the resource site terminal 320 and equipment and sensors (e.g., acoustic logging tool 216a) therein, and possibly with the end user terminals (including the end user terminals of the client and of the expert). In the collaboration, validation and learning module, the one or more computing system processors interacts with end user terminals 314 and possibly client server 324.

Wireline Planning and Service Advisor

Wireline planning module 410 facilitates job planning and may remain a live workspace throughout the life of an operation or a sequence of operations at the oil field 200. In an embodiment, wireline planning module 410 includes a service advisor that allows a client (or customer) to assess the value of one or more services against the client's objectives. In some cases, with the service advisor includes quickly obtaining sensitivity analysis results, evaluating impact of an operation at the oil field 200, and reducing uncertainty of a prediction regarding a resource and/or an operation at the oil field 200 (in particular the client objectives). In an embodiment, the service advisor in wireline planning module 410 conducts computations in a backend and provides a user interface in the frontend to a user with desired outputs, objectives (e.g., values and/or uncertainties of parameters, derisking elements, etc.), and/or other end products/services.

For example, the wireline planning module 410 receives or generates a model of a resource of interest. When the client seeks to assess the well integrity, the model may include a model of a wellbore and/or well barrier, and/or a model of equipment that may be used in the wellbore as part of one or more services. In some cases, the model/resource model is a model estimated based on other models with attributes similar to those of the oil field 200. For example, the model may be estimated from a nearby wellbore similar to the wellbore of the oil field 200 (i.e., with similar casing and/or cement, etc.). In some instances, the model may be inputted into the wireline planning module 410 by the user via a user interface. In an embodiment, a client may provide a customer model (e.g., sub-surface or reservoir model stored in the memory of the client server 324) for a service advisor to use in derisking evaluations. In one embodiment, a model may be generated based on one or more inputs and may represent a current state of a resource at the oil field 200 and may include various information such as model parameter values. In an embodiment, a model represents the current state of a wellbore including a well barrier and may include various information as needed.

Alternatively or additionally, a client may share with the service advisor certain contextual information (e.g., information about a well known to the client, such as wellbore location, wellbore parameters and logs (including, if available, wellbore profile detailing the pipe settings and borehole geometry and specifications including restrictions; wellbore deviation survey, location, state or properties of the barriers, the borehole fluid properties, well operations),. A model may be based on the information provided by the client via a user terminal through an interface or retrieved from a client server 324 and based on data that is known from other sources of information.

A model may simulate inputs, outputs, results, impacts of different sensor technologies. The models are used by the service provider to determine outputs according to client objectives such as whether and how the well integrity is preserved, how much is the uncertainty level, and how to reduce the uncertainty level. Therefore, the service provider improves the client's experience by addressing client objectives without overburdening the client with detailed and complex backend information. In some embodiments, the client may have access to the backend results, for instance upon request.

Based on the model simulating the resource of interest (e.g., wellbore or formation), and one or more objective parameters of the resource set by the client, the client receives results of global sensitivity analysis (GSA) automatically (e.g., via cloud computing on a cloud server). Sources of uncertainty that may affect the model include, for example, lack of information for all or a portion of the wellbore, characteristics of tools capturing the measurement, errors involved in the interpretation of captured data, errors in computational methods, uncertainties due to assumptions made, and uncertainty due to the resolution of data acquired while drilling or logging. As a result, these uncertainties may propagate into forecasts made. GSA may quantify the uncertainty in input parameters and provide a possible range for which a forecast lies. Sensitivity analysis may describe how the uncertainties (e.g., uncertainty values)

in the output of a model or system (here, one or more objective parameters) can be apportioned to different sources of uncertainties (e.g., uncertainty values) in its (e.g., parameters) comprised in the model. In some instance, sensitivity analysis may or identify the contribution of different parameters in the model to the uncertainty of the objective parameters. For example, the sensitivity analysis may determine a degree to which one or more uncertainty values of one or more parameters of the model contribute to an uncertainty value of the objective parameter. Uncertainty analysis may make a technical contribution to decision-making through the quantification of uncertainties in variables. For instance, uncertainty analysis may determine the reliability of model predictions, accounting for various sources of uncertainty in model input and design.

The service advisor may conduct sensitivity analysis relative to the objective parameters in order to determine which parameters of the model have the highest contribution of the uncertainty to the objective parameter. For example, global sensitivity analysis may include varying some or all parameters of the model across ranges of their respective uncertainties and between constraints that have been provided in the model. Simulations may be performed to obtain values for the objective parameter based on the different possible values for the model parameters. The results of the simulations can be analyzed and ranked to identify which parameters of the models are leading to the most significant variations in the uncertainty of the objective parameter. Through multiple simulations which may be run in parallel, the cloud computing platform 310 may determine which parameters have highest level of contributions to variation of the one or more objective parameters (i.e., values of the one or more uncertainties of the objective parameters) and also determine a magnitude of such contributions.

As discussed above, simulation data may be analyzed to identify what model parameters are causing the highest uncertainties or what parameters have the biggest impact to changes in uncertainty values of the objective parameter. As an example, if a set of parameters has an uncertainty range from x % to y %, parallel processing may be used to simulate scenarios for the range x % to y %. Based on the results, parameters associated with a relatively high amount of uncertainty may be identified and ranked higher (compared to other parameters that cause relatively less uncertainty) as parameters for which data measurements can remove the most uncertainties. Data acquisition to stabilize such objective parameters may be identified as a priority in service planning to reduce the overall output uncertainty.

An example of global sensitivity analysis including modelling of different scenario is detailed below.

For individual factors (i.e. model parameters) of a plurality of factors (any number of factors may be included):

a. Conduct a single-factor sensitivity test based on the factor that has a certain range of values.

i. Estimate a base case (50%), i.e. likely value of the factor in view of model constraint (for instance average value of possible range)

ii. Estimate 10% and 90% extremes, i.e. possible extreme value of the factor in view of the model b. Vary the factor with others kept at base value.

c. Calculate the objective parameters for each scenario.

Determine which factors the analysis is sensitive to relative to other factors, i.e. to which model parameters at least one of the objective parameters is particularly sensitive to, i.e. the factors that have the highest contributions in the uncertainty values of the objective parameters. This might be done by variance analysis, i.e. Sobol method. More details on such determination of sensitivity index are disclosed in U.S. Pat. No. 10,203,428, herein incorporated by reference.

In addition or in the alternative, the simulation model may include equipment modeling in addition to wellbore modeling. This may be the case for simulating scenario corresponding to sensor data acquisition according to one or more scenario. This may be performed after the parameters having the highest contribution to the objective parameter are identified and some candidate service that would help the user to fulfill its objective are selected.

For example, a model of sensor response may be included within the simulation model. The combination of modeling wellbore models with expected behavior of equipment provides for a better estimation of the result of performing a certain service. The performance of the equipment on reducing the uncertainty of an objective parameter, performing a specified service, of measuring a sensed value may be recorded and added to a repository of models stored, for example, on the cloud. When the service advisor later performs the simulation, it may retrieve these models to incorporate expected behavior of equipment in the simulated model. The service advisor may leverage cloud based storage to access and store equipment models not previously available for simulations. In some embodiments, the equipment behavior is relatively independent of the wellbore model and the repository equipment models may be reasonably accurate regardless of where they are deployed. In some embodiments, the equipment behavior is dependent on the well model (eccentricity, number of casings, etc.) and the service advisor may retrieve equipment models associated with similar conditions as the conditions of the wellbore model. Thus, the service advisor allows for the realization of new simulations that take into account not only the parameters of the wellbore model but also the modeled response of equipment used in services to provide improved and previously unavailable results.

In some embodiments, simulations of wellbore/tools models are conducted via cloud computing and/or AI technologies, and simulation results can be quickly incorporated into a model to evolve and improve its quality such as accuracy. Cloud computing and AI technologies may enable access to greater relevant contextual and/or historical data and may allow for better integration of both the service advisor and the client's knowledge bases. Further, information may be fed back to an end-user quickly with little to no delay in time, thus allowing quicker updates and decision making by the end-user. Furthermore, cloud computing may avoid the need for complex computation capabilities of wellsite equipment which improves processing and simulation capabilities of the overall system (e.g., thousands of simulations may be conducted and interpreted each second). The service advisor also uses objective parameters input by the client as an objective in order to conduct the analysis. The objective parameters may be set by the client in an interface on an end user terminal and thereafter sent to the cloud based processing on the set of servers.

A model (e.g., a customer model or a proxy model), when focused on well integrity, includes a well barrier model comprising information about the configuration of the wellbore (well geometry), composition of borehole fluid, recent wellbore operations, wellbore deviation and state of the well barrier (i.e. casing and/or cement) if available. The objective parameter may be a state of a barrier (the state of the barrier including an indicator of the casing corrosion and/or of a material within the annulus) and the initial model may have several barriers in several locations, each barrier having a different state, i.e. a state that meets accepted barrier criteria, a degraded state, or a failed state that does not meet the accepted barrier criteria.

The service advisor may use objective parameters inputted by the client/user as an objective in order to conduct an analysis. The objective parameters may be set by the client in a user interface of a user terminal and thereafter sent to the cloud computing platform 310 for processing by one or more servers. In the context of well integrity, an objective may be to limit uncertainties regarding the state of well barriers in one or more wellbores (with the help of barrier monitoring sensors that monitor if the barrier meets acceptance criteria and, if not, the level of degradation of said well barrier) and/or, if a barrier does not meet the accepted barrier criteria, to improve the state of said barrier (which may be reached via the performance of one or more services for repairing the well barrier).

The service advisor may identify one or more candidate services with a likelihood of reducing the uncertainty on the objective parameter, or otherwise improving (i.e. minimizing or maximizing) the objective parameter value. The identified candidate services may be communicated to the user, for example by transmitting and displaying the candidate services on the user terminal (e.g., display device) of the user. The candidate services are identified based on the knowledge of the factors having the highest contribution to the uncertainty values of the objective parameters. In particular the candidate services are the services that are mapped as reducing the uncertainty value of one or more of said factors.

Candidate services may include different technologies such as sensors to enable acquisition of data associated with a resource (e.g., wellbore in a particular downhole) at the oil field 200. The services that may be selected as candidate services may be services that acquire data associated with parameters of the model (e.g., measurement parameter) that have a high contribution on the uncertainty of the objective parameters.

In an embodiment, system 400 may automatically generate a set of scenarios (e.g., each scenario may run candidate/recommended services). Optionally each candidate service may be run with different parametrization or operational elements, and/or different values of the data being simulated with uncertainty fields, and may run simulations of most or all scenarios in order to estimate a forecast model associated with each scenario having an updated parameter (including the objective parameter) and uncertainties (e.g., uncertainty values) taking into account the simulated data in each scenario. In some embodiments, the scenarios may include equipment models such as the expected response of the equipment to the environment of the candidate service. The scenarios may be simulated to account for uncertainty associated with the acquired data.

In one embodiment, scenarios may be simulated to determine faulty equipment calibration (which may include drift in time), or reliability (which may include influence of other environmental parameters) of the data acquired that generate uncertainty in the model parameter refined thanks to data acquisition. A large number (e.g., tens, hundreds, or even thousands) of simulations may be conducted with varying scenarios in the backend (e.g., within the cloud computing platform 310) without being visible to a client/user, and the simulations may be fully automated based on candidate services. The simulations may be containerized and executed in parallel, for example using a cloud-based engine or software as a service platform. In this way, significant computing power can be made available to conduct multiple simulations in parallel and in a short time frame. AI-based algorithms and/or machine learning algorithms and/or deep learning algorithms may be used to improve efficiency and effectiveness of simulations. The simulation may validate the radius of an investigation associated with the oil field 200, resolve quantification of resources at the oil field 200, estimate capacity of a resource relative to a visualization (e.g., image) of the resource, derisk at the oil field 200, etc. For instance, system 400 may automatically rank scenarios based on their comparative performances over the one or more objective parameters and/or propose a technology solution, e.g., by selecting certain sensors, acquisition strategy, parametrization, etc. to be executed at the oil field 200.

Based on the forecast models (i.e. simulations) and the objective parameter, one or more effective services may be selected. The one or more effective services may be chosen automatically or selected by the user.

In an embodiment, the uncertainty and/or value of one or more objective parameters may be determined for each forecast model (i.e. simulation), with one or more effective services selected using an indicator of the uncertainty and/or value. When one forecast model per candidate services is estimated, the indicator may be the uncertainty and/or value of the objective parameter itself. When several forecast models per candidate services are estimated, the indicator may be for instance the average of the uncertainties or values for each of the forecast models relative to the candidate service. In another embodiment, when the uncertainty is of interest for the user, the highest uncertainty of the forecast models relative to the candidate services will be computed. In some embodiments, estimating one or more forecast models may be based at least in part on one or more of an accuracy, calibration, and/or reliability of a sensor at the oil field 200, and uncertainty of one or more updated parameters of the model.

In an embodiment, an effective service may be selected directly by the cloud computing platform 310 based on for example, the indicator of uncertainty. In another embodiment, one or more candidate services may be displayed to the user on a user terminal 314. The candidate services may be displayed with additional information such as the above-mentioned indicator, the costs associated with the service, or other characteristics and/or descriptions of the service. When several models representing several configurations are selected to represent a resource, additional information such as the indicator of uncertainty of one or more objective parameters for other resource configurations may also be provided/displayed as additional information. The user may therefore select one or more candidate services based on the displayed information.

For instance, the candidate services may be chosen in order to take into account several parameters, i.e. on top of the expressed objectives of the client, the suitability, cost, effectiveness and efficiency aspects of a technology in delivering the objective in a specific environment, which is generally obtained via the tool model for each candidate service and may as well include the best practices in managing specific scenarios such as borehole fluid evaluation, pipe thickness, pipe diameter, etc., as well as the costs of the services. The candidate services may be ranked using a multi-factor logic.

In an embodiment, for a given set of objectives (or objective parameters), and a given set of pre-populated information (or initial model), a service advisor may predict the amount of uncertainty that each parameter contributes to the objective parameter and/or select a service that will better reduce the uncertainty of the objective parameter. A user/customer may then design/select wireline acquisition services to reduce uncertainties based on the operations described above.

In another embodiment, for a given set of objectives (or objective parameters), and a given set of pre-populated information (or initial model), a service advisor may predict the highest/lowest value of the objective parameter with associated uncertainties and/or select a service that will better refine the value of the objective parameter as per user's requirements. A user/customer may then design/select wireline acquisition services to optimize the value of the objective parameter based on the operations described above.

As mentioned above in relationship with FIG. 4A, the Service Advisor as comprises a first simulation operation, i.e. Global Sensitivity Analysis, to identify candidate services (as services having the highest contribution on an objective parameter value and objective parameter uncertainty value) and then, a second operation for estimating a forecast model (or simulating) one or more scenarios associated with the candidate services, to identify which service(s) among the candidate services will enable to have the highest impact on the objective parameter.

The first and second operations described above are not always performed in combination and the Service Advisor may, in an alternative embodiment, perform the first operation (respectively the second operation) without the second operation (respectively without the first operation). For instance, the Service Advisor may perform a global sensitivity analysis to determine candidate services that will have an impact on the objective parameter. The recommended services are then the candidate services user can choose between the candidate services according to its own knowledge. Alternatively, the Service Advisor can include the second operation without the first operation. In this case, the simulations may be run for each available service, which might necessitate more time and/or computing power to compute the recommended services.

In an alternative embodiment, the user identifies himself the service he would like to perform at the oil field and does not use the Service Advisor. The following operations based on the selected effective service may however still be performed.

Once the effective service is selected, a digital execution plan (DEP) (or simply, execution plan) may be built/generated and may comprise a comprehensive plan of operations/tasks that are necessary at the oil field 200 to successfully run/execute the selected effective service. In one embodiment, the execution plan comprises one or more tasks executed to complete a selected service. The digital execution plan may be generally built/developed/created on a set of servers associated with the cloud computing platform 310 with the effective service as an input. In some embodiments, the digital execution plan may be transmitted using a wired and/or a wireless communication link to the oil field 200. Digital Execution Plan The section below described in more details how the digital execution plan is built. In some embodiments, an automated planner develops a plan for execution by a controller to run the effective service. The plan of the present disclosure builds greater independence and flexibility into the plan than prior planning systems.

The plan according to the present disclosure defines, for events in the plan, a set of preceding events, a set of following, or successor, events and at least one condition to detect the event having occurred or to authorize an action to be begun. Time is not a determining factor in the plan of the disclosure and the plan is executed based upon event interdependencies and detected conditions without defining event start times, end times or durations in a prescriptive manner. As will become apparent from the following description, the plan executed in accordance with the method of the present disclosure is time independent and can therefore be executed based purely upon logical constraints and both planned and executed incorporating flexibility of time and resources available to carry out the actions in question.

Figure 5:
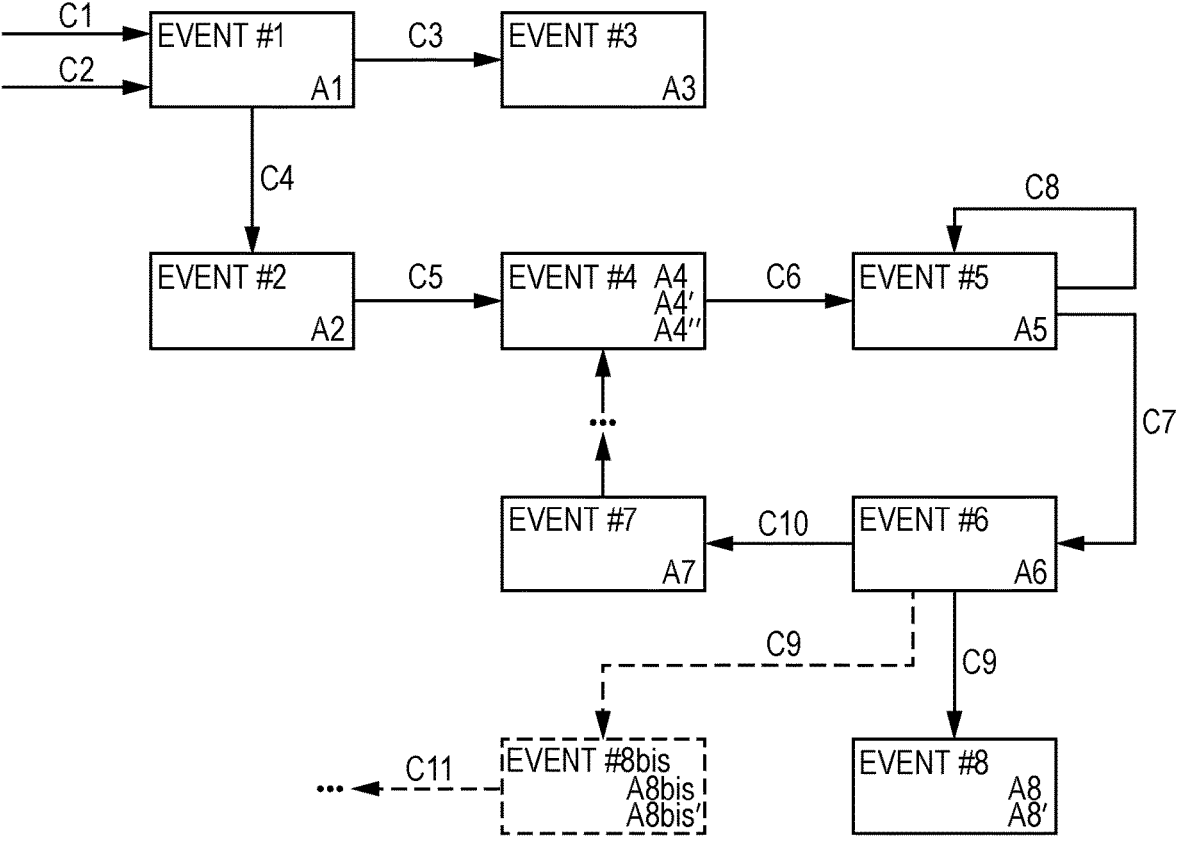
FIG. 5 illustrates an example of a digital execution plan as per an embodiment of the current disclosure.

Turning to the simple plan of the illustrated example, beginning in FIG. 5, the plan starts with event #1, which is an event for lowering a tool into the borehole until an identified target depth. It has successors 2 and 3, meaning that events numbered 2 and 3 (all event numbers are illustrated in the Figures in parentheses) are events following event #1 and since it is the first event it has no predecessors. For the event #1 there is also identified an action number, in this case action #1, denoted on the figures as A1, and an action name, in this case LowerTool. Several actions may be associated to an event. A parameter can also be set for the action and in this case, the parameter is set as Speed High, indicating that the controller should aim to achieve a high speed for lowering the cable. Further, preconditions can be set for the execution of an event and, in this instance, the preconditions are, firstly, that the tool is mechanically and electrically connected to the cable, defined by the Authorising Precondition C1 'connected'. This can be detected, for example, by pressure/electrical sensors in the logging head, by sensing tension in the cable, etc. A further precondition C2 is that the system is not currently being moved, defined as 'notmoving', which can be detected by an output from the winch motor, torque sensors, or other suitable means.

Event #1 therefore starts the lowering process and so in response to Event #1 the controller begins a lowering procedure. The example shown is simplified for ease of reference and conciseness, but in a practical implementation, further steps may be present in the plan.

An example of a failure condition C3 may be defined by a parameter which must stay true for the action entailed by the event to validly continue. This can be defined as a failed condition—i.e. a condition which can directly indicate that the event has failed, and potentially that the overall plan has failed. As an example, Event #1 can have a failed condition set as 'notmoving' while the target depth is not reached. Similarly, other failed conditions may be defined in the plan. As a consequence, a troubleshooting event (Event #3) is started with an action A3 and that will not be described here.

A success condition is a physical situation can cause the controller to know that the lowering operation is complete is that the target depth has been reached (condition C4). This might be measured for instance by measuring the length of the unwound cable. When the success condition C4 for Event #1 is obtained, the plan allows for detection of this in Event #2 including action A2 i.e. stopping. No time constraint is placed on event #2, but the conditions are that for it to occur, Event #1 must have occurred and target depth must be reached (condition C4).

Even #4 may then be triggered when event #2 has succeeded, which condition may be checked by monitoring the movement of the winch at the surface (i.e. winch motor torque is zero for instance-condition C5). Event #4 includes action A4, A4', A4" ie setting a parametrization (in this case 3 parameters corresponding to the three actions) of the tool sensor(s) as per DEP. A parametrization of the tool may be customized as a function of wellbore/formation physics model related to physical properties of a wellbore. For instance, in the well integrity domain, the parametrization of the tool sensors (e.g., firing voltage, window settings, filters) will be optimized based on some parameters of the well (e.g., resonance frequency range, pipe dimensions, mud impedance and velocity). The success condition of this event is that the tool parametrization for each parameter is the same as the expected parametrization as per the DEP (condition C6).

Event #5 includes triggering the measurement with the tool sensor(s) that are correctly parametrized. For instance, when the sensor shall measure a signal (in the case of an acoustic logging tool, an acoustic signal but in case of other tools any other signal such as current, voltage, particle count, etc.), the condition of success of such event is the reception of a current that has a non-zero value or a value higher than a certain threshold (condition C7). If no signal has been received (condition C8), the event #4 has failed and the event #5 is for instance restarted (at least once-when event #5 has failed a certain number of times other actions might be triggered that are not described here for the sake of simplicity).

If a signal has been detected, the plan moves to Event #6 that may include one or more actions to perform a quality check of the measurement. A parameter of the measurement such as a signal to noise ratio (action A6) and/or other parameters may be assessed and if the parameter is deemed sufficient (condition C9), for instance signal to noise ratio above a certain level, the measurement may be considered successful and the plan may move to the next event. More examples of quality checks will be described in a subsequent section. If the Event #6 is considered as failed—i.e. signal to noise ratio not considered sufficient (condition C10), the plan may go to Event #7 that include triggering a new calibration (action A7) that comprise one or more actions and/or events that will not be detailed here for the sake of simplicity (for instance, logging in another section of the wellbore) and then, when implemented, go back to Event #4. If the Event #6 is considered successful, the plan can move to #Event 8 where the tool may be pulled out of hole (Action A8) and data may be sent for processing to the cloud (action A8') for instance. Of course, this plan is very simple for the sake of clarity but many different plans can be set up in different situations.

As can be seen from the preceding description, the execution of the various actions is governed only by logical connections between the events scheduled in the plan and by preconditions which are detected or not detected, either at the beginning of, or during, the execution of certain actions. The controller executing the plan defined herein therefore reads the entirety of the plan and can execute it based upon the logical connections and preconditions set out in steps in the plan which are governed by events.

A plan of the preferred embodiment can in practice be coupled with an operational file and a domain file. The operational file can contain operational data about each of the available actions in the domain for which the planning is being carried out. The domain file is set out in a PDDL (Planning Domain Definition Language)-based language and contains definitions of the environment in which the operation is taking place, in a manner known to those skilled in the art of planning domain definition. The plan definition based on the domain and operational files is described in more details in patent application US2017/0370191, now patent U.S. Pat. No. 11,542,787, herein incorporated by reference.

The execution plan may also include different models as will be described in q subsequent section.

The above described process may also be iterated and updated in real-time. As execution plans are developed and executed or data about a resource becomes available from sources (such as from other measurements from nearby resource sites or the like), the models and/or simulations may be updated and recommended candidate services also updated. Whether or not that model parameter was selected for the execution plan, additional information can be applied to the set of simulation models. In an embodiment, new information can be used to reduce uncertainty and update the uncertainty without performing additional analysis of certainties. In another embodiment, once the uncertainty of the objective parameter (for instance, state of the barrier) has been reduced the service advisor will recommend services to optimize the value of the objective parameter (for instance, repair a degraded barrier). Thus, once the simulations have been performed, results can be stored and further determinations made by terminals/computing systems that may have a low computation power relative to the cloud computing platform 310 thereby mitigating against incurring the costs of requisitioning the cloud computing platform 310 again.

For example, if a parameter had an uncertainty in the range of 5-20% with a resolution of 1, 15 simulations may have previously been performed to cover the range of 5-20. If new information becomes available that the parameter is actually within the range of 15-20, then the simulations associated with the range 5-14 can be removed from the set. With a reduced set of simulations, the contribution of uncertainty can be reassessed and re-ranked. In view of this information, a different candidate service targeting a different objective parameter or a different and less costly or less time consuming execution plan may be selected since the most significant source of the uncertainty may change.

In a particular embodiment, the method may include identifying an at least one second well integrity service to be performed in the wellbore based on the updated wellbore model, updating the execution plan to perform the at least one second well integrity service, and upon reception of the updated execution plan at the resource site, executing the updated execution plan. The execution plan may be updated during the execution of the initial plan. The second well integrity service may include acquiring sensor data using the same set of downhole sensors as for the previous service having a predetermined parametrization and/or at a predetermined location set that may or may not be same as the parametrization and/or location set of the previous service.

An example of how such model refinement may be used to update the Digital Execution Plan is described in more details below. For instance, in another embodiment shown in dotted line on FIG. 5, if the Event #6 is considered successful (condition C9), the data acquired using the sensor and the tool may be sent to the cloud (action A8bis) in #Event 8bis and tool may be stopped at target depth (action A8bis') until a notification is received from the cloud server (condition C11).

On the cloud servers of the cloud computing platform 310, once the acquired data are received, the data are interpreted and the model is refined (for instance as indicated above by limiting the range of one or more model parameters at the target location thanks to the acquired data). The cloud servers of the cloud computing platform 310 calculate the updated parameter value and/or uncertainty value of the objective parameter in view of the refined model. If the uncertainty value is over a certain threshold, the cloud servers may estimate the remaining uncertainty with one or more additional measurements with said tool (for instance, at different target depth) using forecast models (i.e., simulations) as explained above and recommend one or more options to the end user. If the objective parameter value is under/over a certain threshold, the cloud servers may recommend one or more options to the end user. If the end user validates one or several of the presented options, the digital execution plan is updated to take into account the validated options.

The server then notifies the surface unit when the computations have been done and send the updated plan, if any. Based on the updated plan, the tool executes the one or more measurements at the one or more target locations—or is pulled out of hole as originally planned in case the updated plan indicates so. In another embodiment, the user validation is not necessary: for instance, the user may have entered preset acceptation criteria (gain in uncertainty vs time/cost of the additional measurement) and the options are chosen based on such acceptation criteria.

Alternatively, based on the results, the end user may initiate a request of additional measurement and the plan will be updated based on the end user request.

Furthermore, the plan may not be conditioned to reception of model refinement results. It can continue as per the initial plan depending on user's preference and/or model refinement calculation time and update when a request from the user or model refinement results are received.

For instance, the updated plan may include lowering the tool to a second target depth and subsequent events enabling to perform additional measurements with the same sensor, or if the tool includes several different sensors, with a different sensor, that are deemed necessary to reduce the uncertainties of the model.

Therefore, the method enables to update the digital execution plan automatically and/or conditionally to end user validation or preferences in order to optimize model refinement and uncertainties. The plan may in particular be updated while the tool is in the wellbore based on model refinement obtained following to first measurements. Additional measurements may use the tool may in particular be planned based on model refinement.

A particular example of plan refinement has been given regarding the downhole tool. However, the plan takes into account all elements at the well sites (pumps, winch, etc.) and the updated plan may modify the sequence of events planned not only for the downhole tool but for any other element at the well site.

Execution Module

Autonomous execution module 430 may conduct various activities such as data acquisition, computation, parameterization, evaluation, delivery, and contingency planning to be autonomously executed with little to no need for human intervention. For example, surface operational elements at a wellsite may be automated (e.g., by live operations module 432). In an embodiment, wellsite operations such as the deployment of winch, unit, spooling, cranes, pressure control equipment (PCE), sensors, tool mechanics, tool firmware, etc. are automated and controlled based on the DEP. For example, as per the plan, downhole acquisition of sensor data may be controlled such that downhole sensor data may be captured automatically, processed automatically for quality control (QC), interpreted automatically (e.g., using an interpretation library), and incorporated automatically via data transfer (DT) into a customer model (which as disclosed herein may be processed on a cloud or edge server) for simulation and/or decision making. Sensor data may be connected to the cloud, and an Internet of Things (IOT)

architecture may be used to connect edge device(s) to the cloud. Sensor data may be preprocessed, e.g., transformed to be digestible and refined for simulation.

The autonomous execution module includes controllers that can trigger each element at the well site (including winch, sensors, pumps, etc.) to perform actions and sequences as set in the digital execution plan, as well as sensors for detecting preconditions, success or failure conditions of the plan.

Edge intelligence (at well site computing device such a terminal 320) is used where certain automated or guided data processing and execution tasks are conducted by a computing system at the wellsite without the need to transfer data to a cloud server. The edge intelligence helps minimize the amount of data transferred to the cloud server, which may incur a slight delay in time, and allows wellsite operations to continue and respond to changes in any event of network failure.

In an embodiment, the autonomous execution module receives the digital execution plan (DEP) generated by the service advisor and executes the plan using the automated elements/systems/devices of the oil field 200.

In an embodiment, instead of manually performing quality control (QC), the workflow may automate QC via an AutoQC module 434 such that logging data may be acquired and processed automatically in real time for processing at the terminal 320/computing device or at a user terminal 314 or in the cloud computing platform 310. In an embodiment, LiveQC module 436 may obtain real time monitoring data being acquired and may compare the acquired data to values within a planned job as planned in the DEP. In the event of an error or problem, an alert or red-flag may be raised to the user (located at the oil field 200 or remotely), and appropriate actions may be taken to solve the error or problem, after which logging may resume or restart. Suppose, for example, the wellbore is logged in order to acquire ultrasonic waveforms (using an acoustic logging tool) enabling to retrieve information regarding the well integrity, and the signal used for processing only being a portion of the received waveform, it needs to include all of the information contained in the waveforms. Further, if a zone of the wellbore is degraded, it might be useful to spend more time on such zone to understand to which extent it is degraded. During actual operation onsite, if a certain input needs to be changed to obtain desired results, for instance, the portion of the processed signal, or if a zone of the wellbore needs to be re-logged, then decisions and actions may be taken automatically and/or by a domain champion (e.g., data interpreter) and/or a remote operations field engineer monitoring a job and the DEP may be accordingly updated in real-time or pseudo-real-time. Alternatively, the domain champion or field engineer may validate the decision being taken automatically within the autonomous execution module 430.

Those with skill in the art will appreciate that, while the term "real-time" is used herein to describe some data acquisition and systems control characteristics, "real-time" may also refer to near-real-time/pseudo-real-time or predetermined or maximum response time, depending on factors related to the architecture of the systems (e.g., drilling equipment, data acquisition systems, and other onsite control systems) used at the oil field 200. In this disclosure, the use of "real time" or "real-time" may refer to actual real-time system responses, near-real-time system responses, or systems with pre-determined or maximum response times.

Interpretation and Collaboration

In an embodiment, wireline planning module 410 and autonomous execution module 430 interface with collaboration, validation, and learning module 450 to engage with a customer or end user, for example to plan, re-plan, calibrate, re-calibrate or interpret collected results in real time using one or more interpretation workflows. For example, autonomous execution module 430 may automatically acquire sensor data downhole (e.g., well barrier data) and automatically process such data. Collaboration, validation, and learning module 450 may use AI-based models to automatically interpret data using an interpretation library 452 including one or more interpretation workflows and provide the interpretation in real time.

Data obtained from the interpretation workflows may be quickly consumed and/or incorporated back into the resource models (e.g., a wellbore/well barrier model), which may then be updated for a user to see the impact of acquired sensor data acquired in real-time or previously acquired. Results (e.g., in terms of impact such as sensitivity, uncertainty or certainty, etc.) from executing the collaboration, validation, and learning module 450 may be downloaded from a cloud computing platform 310 in real-time and may be presented to the user via a user interface. Therefore, system 400 may refine models in real-time and/or adapt data acquisition in real-time, according to some embodiments. An application of real-time adaptation is to impact the acquisition program (or the DEP) as it is being performed at the oil field 200 (e.g., wellsite). In an embodiment, actual acquired data from the oil field 200 may be incorporated into a model. The model may be subsequently refined such that uncertainty associated with a given parameter is reduced or removed in subsequent simulations based on the refined the model or parameter value is updated. The user may assess results of new data and rely on updated model(s) to make quicker and more informed decisions. For instance, the user may decide in real time to change the DEP to obtain additional data points, and/or may change operational parameters.

Some interpretation workflows may be automatically performed to refine the model and the results may or may not be presented to the user. Some interpretation workflows may be specifically requested by the user. In this case, these interpretation workflows are designated "products". In an embodiment, there are three levels of interpretation workflows, i.e. basic, intermediate and final interpretation workflows. At least the final interpretation workflows are designated "products". An example of basic, intermediate and final interpretation workflows in the well integrity domain regarding measurements taken by acoustic logging tools are given below: a basic interpretation workflow represents computation or extraction of time travel, amplitude, phase or decay, spectra or other characteristics from the received acoustic signal (for instance for a pulse-echo measurement), an intermediate interpretation workflow is representative of an acoustic impedance of the material contained in the annulus based on the computed characteristics of the and a final answer product is representative of the type of material in the annulus using the acoustic impedance taken by the pulse-echo measurement but possibly additional measurement such as pitch-catch measurement and additional modelling (for instance, Solid Liquid Gas map as mentioned in U.S. Pat. No. 10,119,387). Many other examples of interpretation workflows are available for the same or different measurements in the well integrity domain (such as casing diameter, casing thickness, casing corrosion, tool eccentering, casing eccentering, mud acoustic impedance, mud slowness, etc.).

Each product generally gives access to the client to the value of one or more updated parameters of the refined model, and is presented to a client on an end user terminal possibly with an uncertainty. The presentation of the product may vary depending on the end user, in particular in view of the job description or the preferences of the user.

The collaboration, validation and learning module 450 may include an example digital space for collaboration, validation, and learning during or after data acquisition that present data that has been acquired and all or part of the refined model, including updated parameters. The digital space, which may be implemented as a collaboration dashboard or some other digital platform, may bring together people, expertise, software, and processes. In some embodiments, this digital space allows people to connect to one another using different user interfaces from distant geographical positions in real-time or offline. In some instances, the space may enable integration and/or displaying of data acquired at various times, from various sources, that have been incorporated into the initial model, forming the refined model, which leads to a traceable and collaborative analysis of the refined model. This digital space, for example, may use data in combination with or in isolation from different forms of data that was previously acquired or is being acquired in real-time. According to some implementations, the digital space may allow pre-loading of prior data from various sources such as well schematics, drilling data, logging while drilling (LWD) data, wireline logs and cementing information. In one embodiment, the digital space may display real-time streaming data alongside prior data as an initial step towards an integrated and holistic analysis. The digital space may, in other embodiments, allow a time-lapse analysis of similar data. In some cases, the digital space may use a predefined or a customized template(s) either in the same user interface (e.g., a browser) or in different user interfaces. The digital space in some instances may allow synchronized displaying of streaming data and interactions/actions that have been performed or executed on the data.

The digital space may include a collaboration space with certain points of interest or focal points (e.g., zones of interest) that help different people collaborate in arriving at certain conclusions related to the state of acquired data and/or processed data. The space may allow tagging inferences on the state of data (quality or outcome or assessment) to a complete set of data or a sub-set of data for a specific zone or a focal point. This allows cataloging raw data with its respective processing, inference/interpretation that can be the basis of automation and machine learning.

The digital space may also include a collaborative dashboard (e.g., digital space) that may allow additional functions such as user interaction with data and validation of acquired data and results that may form the basis of a learning system. The dashboard may interrogate parameters or other values that have led to the final data computation. The dashboard may highlight a specific focal point on acquired data to achieve various functions such as: to flag its state related to the nature of discussion (e.g., data quality, interpretation, inquiry), to trigger a discussion on the focal point, to arrive at a final collaborative conclusion on the focal point, and/or to finally resolve the focal point as validated with consensus on the focal point. The scope of a focal point may be a small section of acquired data (in depth or in time) to discuss specific and localized anomalies or points of interest. The scope may alternatively cover an entire well (e.g., on matters related to the entire well's data quality or completeness of interpretation).

The validated data may be a basis of a learning system and serve as a training database for data interpretation relative to other wells and acquired later. For instance, data related to the focal point may be stored in a structured manner.

Further, the collaborative dashboard may allow to have access to the final deliverable (computation) but also the raw data in order to use QC tools on the raw data, to change manually one or more parameters of the well or tool model and simulate deliverables with the raw data and updated model parameter, to use a different processing on the raw data, to comment results or integrate results of multiple logging tools used in a same section of a well on a same dashboard.

In some instances, collaboration, validation, and learning module 450 may work in conjunction with wireline planning module 410 and autonomous execution module 430 to use artificial intelligence (AI) and/or machine learning, and/or deep learning processes, for example, to incorporate data back into a model and/or update parameters of the model in real-time. For example, validating a parameter and/or an updated parameter associated with a model may include using acquired data and/or other validated/updated parameters in a machine learning tool and or artificial intelligence tool. The autonomous system may be open to third parties such as a client who may develop products/services in collaboration with a service provider/a service advisor (e.g., service advisor discussed in association with FIG. 1) and may have access to models, sensor data, metrology data, etc. In some implementations, real-time, collaborative dashboards may be implemented on a cloud infrastructure for data monitoring and automated processing. In an embodiment, catalogs (e.g., reference models) may use labeled focal points stored in the interpretation library 452.

Example Relative to the Well Integrity Domain

Suppose, for example, a client wishes to accomplish an objective such as determining a certain parameter of a well barrier (e.g., the degree of casing corrosion and/or composition of material in the annulus). In this example, a client may provide casing corrosion of the barrier as an objective parameter. To achieve this objective, according to an embodiment, the client may use a client terminal to provide known contextual information about the barrier, such as prior knowledge of current borehole fluid, pipe behavior, and tool string. A service provider, taking input from the client, may use a cloud server to build an initial model of the barrier based on prior knowledge of the barrier. The service provider may also enter its own prior knowledge of the barrier via a service provider terminal in building the initial model. In some cases, a barrier model may simply be provided by the client or located from a database of the service provider.

Based on the initial model and the objective parameter, the cloud server may generate multiple wireline candidate services for determining the objective parameter. Some or all of the candidate services may be presented to the client for selection, for example, with additional information such as an uncertainty associated with each service, price of the service, descriptions of the service, etc. The client may select an effective service among the multiple candidate services. The cloud server may build a digital execution plan (DEP) specifying operational parameters of the selected service, and may send the DEP to an oil field 200 (such as terminal 320) for autonomous execution of the DEP. At the wellsite, for example, certain sensor data regarding the barrier may be acquired using wireline tools deployed downhole. Automated quality control of acquired data is also performed at the wellsite. During wellsite execution, the DEP may be modified as needed, for example, if acquired data has poor quality. The model of the barrier may also be refined based on acquired data. The wellsite system may send acquired data to the cloud server, which may use the acquired data to compute the objective parameter, now with reduced uncertainty. The determined objective parameter may be displayed to the client on the client terminal in the form of an answer product. Therefore, the disclosed wireline service workflow may be considered an end-to-end (from sensor to customer) implementation. Following such a workflow allows the client to achieve various objectives faster, with better results, and from flexible locations, which in turns helps the client's decision making regarding oil and gas operations at the wellsite.

Figure 6:
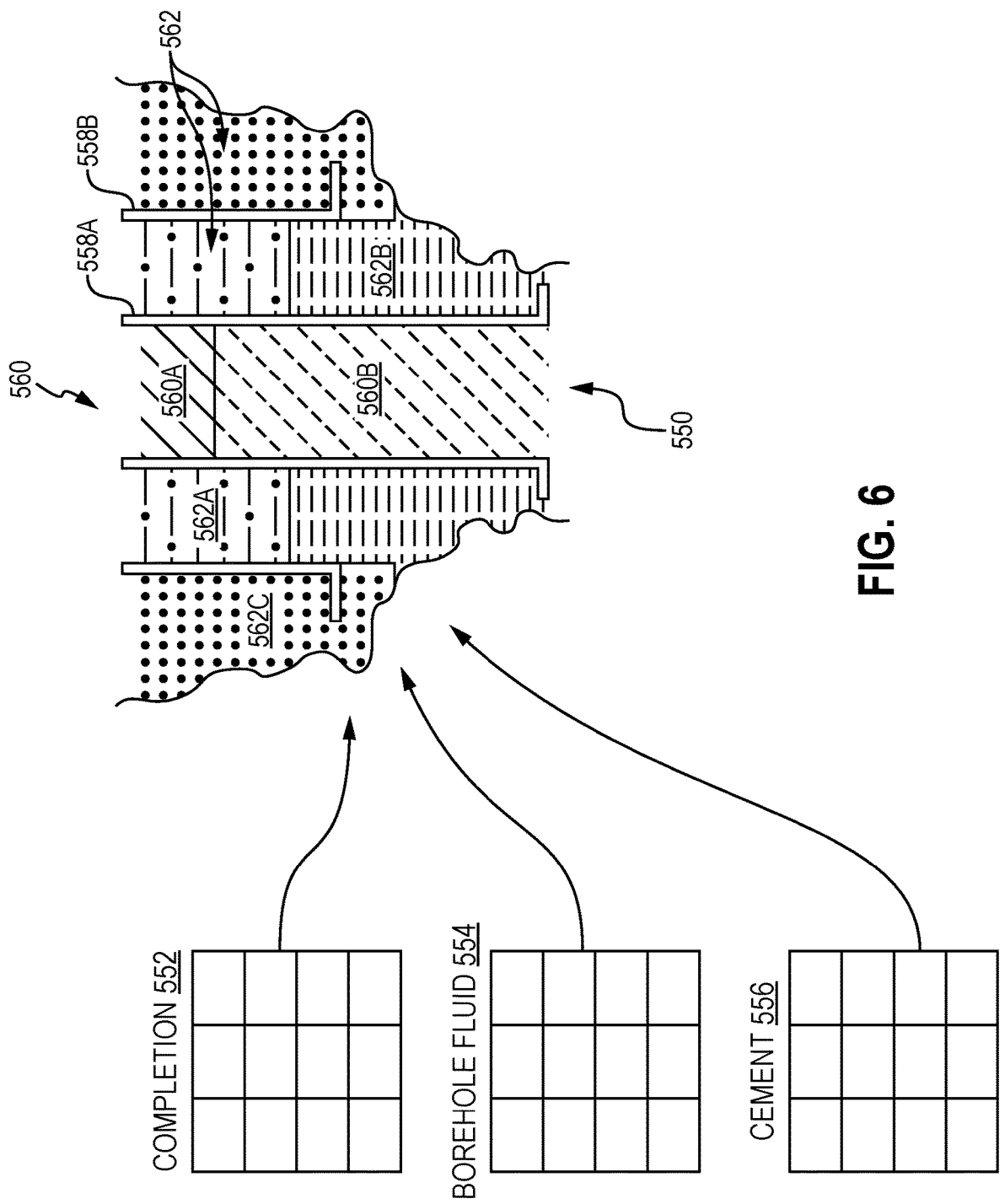
FIG. 6 illustrates an example of a wellbore (i.e., well barrier) model according to an embodiment of the disclosure, FIG. 7 discloses an embodiment of a method according to the disclosure, in the context of acoustic logging, FIG. 8A discloses an example of a digital execution plan according to an embodiment of the disclosure, and FIG. 8B discloses an example of logging passes according to a digital execution plan.

FIG. 6 illustrates an example wellbore (or well barrier) model 550 which may include a representative understanding of the state of a wellbore, such as a state of the borehole fluid, a state of the annulus, and a state of one or more casings (i.e., pipes). As shown in FIG. 6, wellbore model 550 may be derived from prior information such as a completion profile or design (parameterized grid 552), borehole fluid (parameterized grid 554), and cement information (parameterized grid 556). The wellbore model may include a model of the pipes (558), a model of the expected mud profile (560) and a model of the expected annulus (562). The model that has been presented is relatively simple as it comprised two nested casings 558a, 558b, annulus 562 at the external border of each casing (each casing being cemented to the formation after being set) and borehole fluid such as mud profile 560 in the inner casing. The borehole fluid and annulus model may include a plurality of zones 560a, 560b, respectively 562a, 562b, 562c depending on the nature/property/composition of the fluid, wherein the property of the material are considered homogeneous in each zone, for instance. It is to be noted that more complex models may be created, for instance comprising more pipes, annulus and borehole fluid zones, eccentered pipes, etc. Parameters may be associated with each zone of the borehole fluid and annulus depending of properties of such zones (mud velocity or slowness, density, or composition of the material in the annulus for instance). Parameters may also be associated with each pipe such as casings 558a, 5558b (diameter, thickness, eccentering, etc.).

In an embodiment, a wellbore model 550 may be derived from information which includes but is not limited to: a completion design or well schematics detailing the pipe and borehole geometry and specifications including restrictions; well deviation survey; the location and state of well barrier(s); borehole fluid inside the tubulars and/or the annulus; well barrier properties such as cement; recent wellbore operations such as pressure testing; etc.

An example of the system 400 applied to well integrity may have a barrier to barrier approach. The modules of system 400, including wireline planning module 410 (sometimes called a service planning module as it includes a service advisor), autonomous execution module 430, and collaboration, validation, and learning module 450, apply to this embodiment as will be explained in details below.

Planning may start with an initial state of a well barrier as the resource model. For example, a client or a service provider may generate or populate a model such as a well barrier model in wireline planning module 410. The well barrier module may include information about the configuration of the well (well geometry), composition of borehole fluid and of cement, recent well operations, well deviation and state of the casing or cement if any information are available. The client operator has the ability to determine the current (or most recent) information related to a documented state of a well barrier. The determination may be done either manually by entering the current state of the well barrier, or done through an automated system (e.g., by automatically populating the state from a well barrier model, such as retrieved from a repository, or a similar database at the front end, such as by a proxy model).

Figure 7:
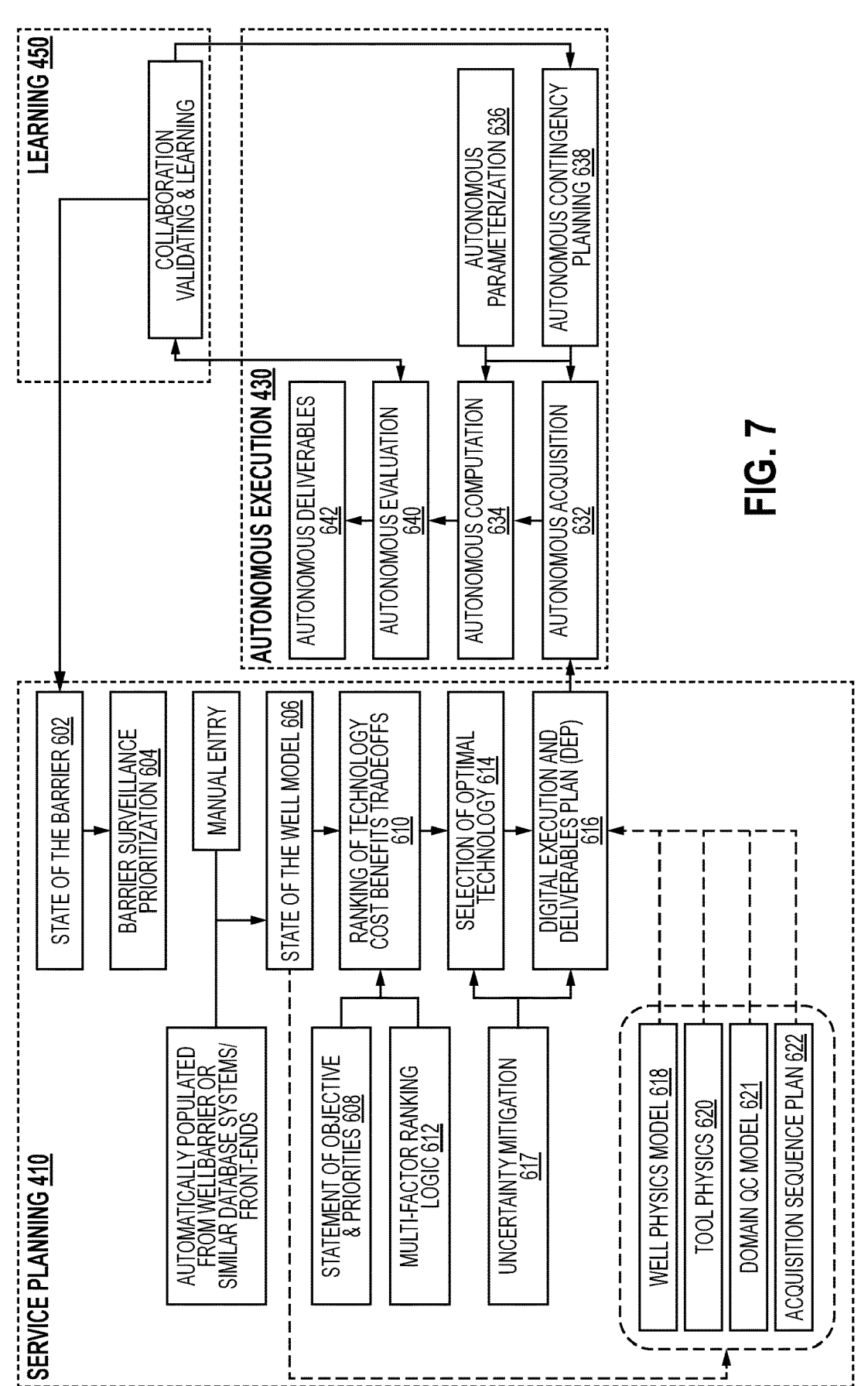

With reference to FIG. 7, in an embodiment, the wireline planning module 410 workflow may include consulting a state of wellbore barrier (block 602) based on the available information of one or all of the client wellbores and determining from the state of the barriers a barrier surveillance prioritization (block 604) determining where wellbore surveillance is needed the most, typically where information is missing or where a degraded state of the well barrier has been reported or suspected.

Where a wellbore has been prioritized for surveillance, a state-of-the-well (well barrier) model is set up based on the current well information as explained in relationship with FIG. 6 (block 606), and client objectives related to the barrier surveillance are determined (block 608). As mentioned above, the objective parameter may be a state of the barrier, a casing corrosion indicator and/or a material composition in the annulus and the client may seek either to reduce uncertainty regarding the objective parameter or to optimize value of the objective parameter. Client objectives may be stated, expressed, selected, or otherwise entered using interface on end user terminal.

As an example, the initial state of the well barrier may have a number of states, e.g., a state that meets accepted barrier criteria, a degraded state, or a failed state that does not meet the accepted barrier criteria. The workflow enables a barrier surveillance that monitors the state of a well barrier to ensure that the well barrier meets and continues to meet acceptance criteria. In the case of degradation, the workflow monitors the level of degradation of the well barrier and potential severity of degradation. There may be a relatively high level of uncertainty on the state of a well barrier and its capacity to perform its designed functions and the objective of the client may be to reduce such uncertainty. In the case of an identified failed barrier, the workflow may identify the location of failure to allow an appropriate plan of remedy or intervention.

Different technology options are ranked with the service advisor (block 610) that will enable to fulfill client's needs as explained in the details above. In an embodiment, each option is associated with a rationale explaining why a recommendation meets the stated objective or will not deliver an optimal solution for one or more of the client objectives.

In an embodiment, the service advisor ranks the options (i.e., recommended services) according to client objectives and priorities (at block 608)—through simulations (i.e., Global sensitivity analysis and/or forecast models of different candidate services) that are focused on objective parameter (value and/or uncertainty) optimization as well as on a multi-factor ranking logic (block 612) taking into account different parameters including: stated objective(s) of the client; the suitability, effectiveness, and/or efficiency of a specific technology in delivering on the stated objective(s) and in the specific operating environment (e.g., best practices in managing specific scenarios considering parameters such as borehole fluid attenuation, pipe thickness, pipe diameter, signal to noise ratio (SNR), etc.); as well as other factors such as costs and availability for instance.

In an embodiment, client objectives may be established client workflows that dictate the choice of technologies and processes (e.g., zonal isolation or casing cut and pull, as used by the client operator or by a service provider), may be specific tasks in isolation or in combination (e.g., pipe inspection or cement evaluation). In this case, the service advisor may not be used by the client (if the client procedures have already identified a service) and/or may be greatly constrained by the client's constraints to output recommended services and/or technology.

Based on the output of the ranking at block 610, a client operator may make an informed decision in selecting the recommended technology by considering tradeoffs between cost and benefits. The technology is then selected by the client based on the service advisor service ranking (block 614), and based on client's decision a digital execution plan (DEP) is set (block 616), both in order to mitigate the uncertainty (block 617) of and/or optimize the initial state-of-the-well model.

The Digital Execution Plan is set up based on different elements including a wellbore physics model (block 618) that can be or include the state-of-the-well model (at block 606), a tool parameters model (block 620), a domain quality control model (block 621), and an acquisition sequence plan (block 622). The DEP is indeed set up so as to adapt to many circumstances, including contingencies, acquisition problems and refinement of the well model, as will be explained in more details below.

In an embodiment, the DEP is set up completely automatically. In other embodiments, the DEP is set up automatically and optimized/validated by different stakeholders. For instance, using a planning dashboard, a well integrity subject matter expert SME (e.g., end user) may utilize the system 400 to validate a digital execution plan DEP. A drilling or asset manager may work with a well integrity SME on an interactive planning platform by considering various planning scenarios, to which sales and commercial personnel may also contribute. Elements of the DEP that may be of particular attention are location of measurement and/or logging speed.

The DEP (set at block 616) may be customized for each wellbore based on a predicted state-of-the-well model (at block 606), client objectives (at block 608), and the choice of technology (at block 614). The DEP (set at block 616) may be provided in the form of a data structure.

Once finalized and/or validated, the DEP is communicated to the well site, for example at an edge server, in connection with autonomous execution module 430, guides the autonomous execution of a wireline logging plan.

Autonomous execution module 430 includes performing an autonomous acquisition (block 632) to make sure that the tool has correctly worked (signal has been fired, received, etc.) and captured the essential information relative to the barrier element(s). In particular, at the resource site, an orchestration system (sometimes provided by an edge processing device) may receive the DEP and control a data acquisition system based on a DEP schema. For example, the edge during acquisition executes planned passes (according to the DEP) with the pass specific acquisition and computation parameters stipulated in the DEP as will be explained in more details below.

In an embodiment, data acquisition parameters according to the DEP are at best estimates. Therefore, the method may include automated validation or quality check (QC) performed by an automated QC system provides real-time validation and corrective actions for raw data acquisition (ACQ QC)—not shown on FIG. 7. QC is performed regularly to improve the data acquisition parameters. In some embodiments, when the plan includes several logging passes, QC'd parameters are subsequently used and passed on to subsequent passes.

The autonomous acquisition (block 632) is obtained in particular by comparing the obtained acquisition versus the domain QC model. The integrity of data acquired is paramount as any issues in the recording of data irrevocable. For well integrity, the measurements that are often used are acoustic measurements, based on pulse-echo or flexural measurement, as explained in relationship with the hardware. For such measurement, example of acquisition parameters that are monitored and evaluated will be described in more details in relationship with FIG. 8.

Once the acquisition has been correctly set, the method comprises an autonomous computation (block 634) deriving one or more target wellbore parameters based on the acquired information. Such autonomous computation takes into account an autonomous (tool and wellbore) parameterization (block 636). The autonomous parametrization optimizes the other parameters of the model and tool. The autonomous computation enables to automatically interpret data to obtain parameters relative to the state of the barrier such as casing corrosion indicator and composition of the material in the annulus based on the data acquired by the tools used in the wellbore and processing techniques that are not detailed here. Such processing techniques may include in particular artificial intelligence. In a particular embodiment, the computation is obtained based at least on a first characteristic measured in the wellbore.

The autonomous parametrization (block 636) optimizes the other parameters of the model and tool. The autonomous parametrization (block 636) includes an automated quality check of the computation parameters obtained at block 634 that will be explained in more details in relationship with FIG. 8.

As discussed above, the autonomous computation may be refined based on updated parameters in the autonomous parametrization and/or applied the wellbore model refined thanks to the autonomous parametrization may be applied to the subsequent logging passes of the tool in the wellbore.

If certain predetermined criteria are met by the acquired data, an autonomous contingency plan (block 638) may be triggered as will be explained in more details below.

The method may also include an autonomous evaluation (640) for verifying the validity of the results obtained from the computation. Such autonomous evaluation may verify the computation by checking if the values of the wellbore parameter resulting of the computation are consistent with other related results obtained via downhole measurements (for instance, casing corrosion indicators obtained by acoustic and electromagnetic logging and/or caliper if both are available). In other words, the autonomous evaluation comprises using a second characteristic relative to the wellbore parameter that is measured in the wellbore and validating the computed wellbore parameter based on a correlation between the computed value of the wellbore parameter and corresponding second characteristic. A confidence index may also be generated during autonomous evaluation based on the correlation.

Alternatively or in complement, the autonomous evaluation may correlate the statistical distribution of the data points of the first characteristic (for instance, acoustic impedance) used to compute the wellbore parameter in all or part of the wellbore with typical statistical distribution for such data points in other wellbore to evaluate the likelihood of the computed wellbore parameters. The deliverables are delivered autonomously to the user that is generally situated remotely from the well site (block 642), for instance according to DEP schema that stipulate select deliverable components. The deliverables may also be delivered to a collaboration platform (i.e. live product dashboard) where several SME may collaborate to analyze the obtained results. On the live product dashboard, performance assessment versus metrics and analysis of results may for instance be conducted.

Figure 8A:
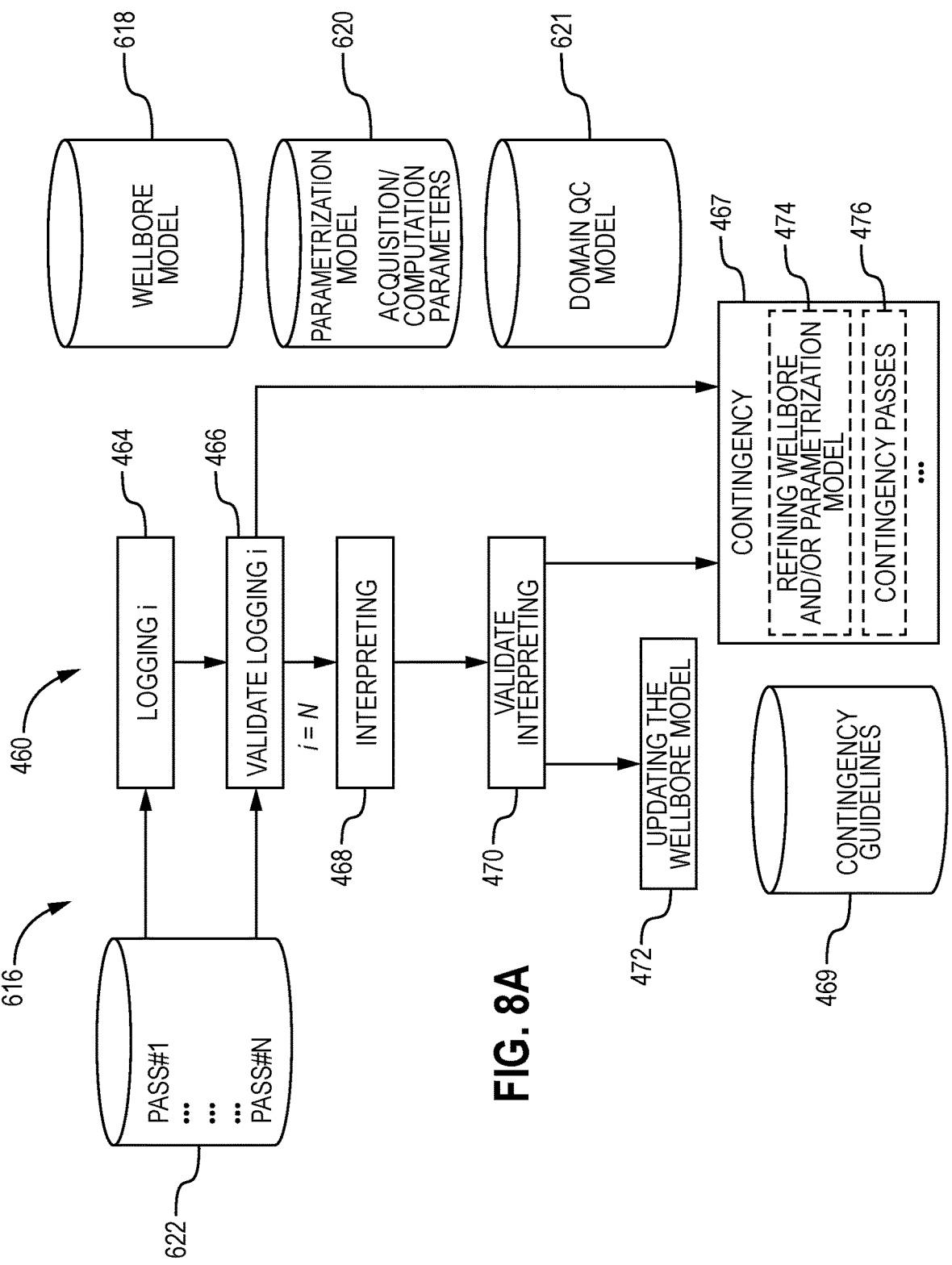

An example of a DEP (set at block 616) for the above-mentioned method is disclosed thereafter in relationship with FIG. 8A

In an embodiment, the plan may include a well physics model 618 related to physical parameter (e.g., properties) of a wellbore (e.g., resonance frequency range, pipe dimensions, mud impedance and velocity) as explained above. It may also include a parametrization model 620 including a parametrization of the tool (acquisition parameter values) and a parameterization of the resulting computations (computation parameter values). Acquisition and computation parameter values may be customized as a function of wellbore physics model related to physical properties of a wellbore (e.g., resonance frequency range, pipe dimensions, mud impedance and velocity) at the planning stage. For instance, tool parameters (e.g., firing voltage, window settings, filters for the acoustic logging tool) (620) that affect raw data quality (e.g., waveforms, SNR for the acoustic logging tool) are customized. Such customization impacts or even controls the quality of data acquisition from the tool as will be explained below.

The DEP (set at block 616) may also include a domain quality control model (block 621) that may be customized at the planning stage. The definition of accepted versus failed states (or acceptable versus undesired states) during acquisition of raw data and/or computation of processed results are articulated. In particular, when expected characteristic of the acquired data are stored in the domain quality plan.

The DEP (set at block 616) may also include a sequence 460 of one or more logging passes, e.g., a sequence of actions to trigger relative to one or more equipment at the well site. Such plan is customized/updated to meet not only computational workflow requirements but also to address data acquisition requirements that may need to be improved for different sections of a well (e.g., due to changes in fluid or pipe schema). The DEP (set at block 616) may, for instance, include a specification for the number of passes (1, 2, . . . N) corresponding to block 622. The pass specification indicates starting and stopping depth and whether the pass is in the up or down direction for each pass.

For each pass, the structure of the sequence 460 at high level may be similar: it may include a logging event 464 comprising a plurality of actions (such as triggering the downhole tools and/or sensor, moving the downhole tool, performing the computation, etc.). Such logging event may include for instance autonomous acquisition (block 632) as per FIG. 7 diagram. The logging event and calls the pass specification (block 622) and parametrization model (block 620) and possibly the wellbore physics model (block 618) to perform the logging pass as per the plan. The passes may be full or a pseudo collection that measures some data and estimates or interpolates other data.

Once the logging pass is over (for instance the logging event having one or more success conditions including that the tool has reached the stopping depth), the DEP (block 618) may include validation event 466 for said logging pass that includes automated data quality control for acquisition parameters. Such event may call the domain quality control model (block 621) and possibly parametrization (block 620) and/or wellbore physics model (block 618) if the domain quality control model depends on such models. If the validation event indicates that the expected data was not collected (failure condition), e.g., that one or more of the characteristic of the acquired data does not correspond to the expected characteristic as per the domain QC model (block 621), the DEP (block 618) may include a contingency plan 467 to execute, based on contingency guidelines 469 contained in the plan (corresponding to a troubleshooting sequence as disclosed in relationship with FIG. 5). If the expected data was collected, the sequence goes to implementation of logging pass i+1.

Examples of quality control operations regarding acquisition parameters of wireline acoustic tools are given below. Some of the quality control for acquisition parameters explained below in relationship with acoustic logging tools could be applied with modifications that can be determined by the one of ordinary skill to other logging tools.

First examples of monitored acquisition parameter are relative to a waveform integrity. Indeed, in ultrasonic acquisition (pulse-echo or flexural measurement), the entire waveform is not recorded and transmitted to the well site for processing, only a portion of it is generally recorded. Therefore, the time window during which the signal is recorded must be correctly set. However, depending on several parameters of the well (i.e. hole size, borehole fluid properties and in particular slowness, eccentricity), this time window can vary from a job to another or even a portion of the well to another. Such parameter is therefore monitored as part of the autonomous acquisition. In an embodiment, as part of the DEP, a default time window is set based on the well parameters that are known. The default time window may be set based on a waveform simulator that takes into account the wellbore parameters. The autonomous computation includes verifying the relevance of the time window by checking the portion of the waveform obtained in the time window against a waveform model as part of the domain QC model. In an embodiment, this operation may use machine learning and classifies a set of received waveforms in view of a training dataset in the acceptable or undesired quality set. If more a predetermined proportion of the waveforms are classified in the undesired quality set (for instance 5%), the quality is set to undesired. In another embodiment, quality of cross-correlation with a single synthetic reference trace may be obtained and the acceptable or undesired quality is determined by the amount of cross-correlation. In such embodiment, the single reference may be obtained based on similar wellbore conditions, for instance by the ultrasonic simulator. If the quality is considered undesired, the time window is changed as part of the autonomous computation. The time window may be increased/decreased by simple iteration or the domain QC model may include a module for calculation of updated time window. In this case, the DEP may be changed as well, in order to check for the relevance of the updated time window.

To validate the waveform integrity, additional or alternative computation may be made. For instance, the group delay may be checked in a training database or may be a group delay of a simulated waveform. As a reminder, the group delay is defined as the first derivative function of the phase of an energy spectrum with respect to the frequency of the energy spectrum and, in wellbore integrity application, enables to locate the resonant frequency of the casing as it is the frequency at which an energy loss occurs (i.e., the frequency at which the group delay is maximum).

When the chosen tool to perform the service comprises two measurements (pulse-echo and flexural), the time window for one of the measurement (generally flexural) may be deduced from the time window set and verified for the other measurement (pulse-echo) using as well information based on the well physics model (and of the tool model.

Second examples of monitored acquisition parameter are relative to a signal-to-noise ratio. Indeed, the signal to noise ratio is optimal to ensure that the signal is neither significantly attenuated nor saturated. A monitored parameter may be the acquisition gain channels or the noise floor. The domain QC model may comprise threshold for some parameters that determine if the monitored parameter is in an acceptable or undesired state. For instance, a threshold may be set on an absolute value or on a ratio (for instance a ratio between the values of two channels). As part of the autonomous acquisition, the signal strength may be dynamically readjusted and/or different filters may be activated for removing a type of noise.

When all of the logging passes as per the plan have been performed, the sequence 460 moves to an interpreting event 468 including interpreting the acquired data to compute one or more wellbore model parameter values and/or uncertainties (corresponding to block 634 of FIG. 7). The interpretation is made using the parametrization model (block 620), in particular the computation parameters and the wellbore physics model (block 618), that includes one or more predetermined wellbore parameters that are used to compute the computed wellbore parameter. As an example, the casing parameters that are computed based on the acquired data may also depend on borehole fluid parameters such as borehole fluid slowness. Once the interpretation event has successfully occurred, the sequence moves to validation of the interpretation 470. Such validation includes a quality control of the interpretation that compares at least one characteristic derived from the computed wellbore model parameter values and/or uncertainties to an expected characteristic defined in the domain QC model (block 621). The quality state of the data is determined either as acceptable or undesirable. This event may correspond to the autonomous parameterization (block 636) of FIG. 7.

In an embodiment, the quality control includes determining change points in the computed wellbore model parameters and deriving change points in the one or more predetermined wellbore model parameter. The derived change points for the one or more predetermined wellbore model parameter are compared to expected change points. In particular, the one or more predetermined wellbore model parameters are relative to borehole fluid and/or casing internal diameter and/or casing thickness. In other words, the quality control includes detecting abrupt changes in the pipe thickness or borehole fluid, using change points techniques. As an example, pipe thicknesses zone are identified with the change point technique using the pipe thickness measurement. Thereafter, the thickness of the pipe measured at a predetermined depth or the average thickness measured in the zone is compared to the thickness that is known from the wellbore model. The thickness is compared to expected thickness to understand if the data quality is acceptable or undesirable. If the thickness deviates from the model in at least the zone or in a plurality of neighbouring depths, the wellbore physics model (block 618) (well profile) may be updated, for instance by updating a casing internal diameter. Similarly, the mud slowness results are monitored. For instance, slowness versus depth is plotted and change points where the slope of this quantity changes (of more than a predetermined percentage) are flagged (with collar location excluded if they are known already). For each change point, it is verified if the change point occurs at a collar location in which case the change of slope may be due to the pipe parameter and the pipe parameters are verified. If there is a change in the pipe parameters, the change point is discarded. Once the final set of change points is obtained, mud zones in which the mud is of the same type are set so as to be delimited in depth by two adjacent change points. The mud (or borehole fluid) may be classified (for instance as oil-based, water-based, etc.) based on a representative slowness value in the zone (for instance, minimum, maximum and/or average in the zone) and mud composition in each zone is compared to expected mud composition.

Other examples of quality control may comprise normalizing the processing techniques by checking the obtained results versus reality in a zone that is well-known or, when two measurements or two different processings giving access to the same parameter (for instance, acoustic impedance) are available, the results of one measurement versus the other measurement. The value of a wellbore parameter (for instance, mud impedance) or of a tool parameter (for instance, flexural offset) may therefore be updated as a result of the normalization if there is a discrepancy. The normalization may be repeated in several depths of the borehole, in order to take into account variations of wellbore model, in particular of mud properties, with depth.

Alternatively, the interpretation and/or associated quality control could alternatively be performed remotely from the resource site, which would trigger additional transmission operation.

When validating the interpretation returns an acceptable state, the computed wellbore parameter values and/or uncertainties are updated 472, which may include transmitting them to a remote server (e.g. at a location remote to the resource site). Additional data may be transmitted as well, such as the raw measurements, for instance if requested by the user. Once transmitted, they are generally displayed to the user.

When validating the interpretation returns an undesirable state, the sequence includes performing a contingency plan 467. The contingency plan 467 may include one or more actions defined at the planning stage based on the outcome of the validation. It may include updating 474 the wellbore physics model (block 618) and/or parametrization model (block 620), for instance the predetermined wellbore parameters or tool parameters of undesirable quality. It may also include performing additional computations and/or additional logging passes 476, to acquire the data with the same or different parametrization at the same or a different location, and/or to perform additional calibration of the tool. Such operations are listed in the diagram of FIG. 7 as autonomous contingency planning (block 638).

In an predetermined embodiment, a contingency plan may include dynamically updating the DEP by adding contingency passes to the DEP using predefined contingency passes parameters. Such contingency plan might include passing with a slower logging speed in a degraded zone or triggering an additional sensor upon meeting of a predetermined criteria. The contingency may dynamically activate contingency passes for relevant sections using pre-configured contingency pass parameters for a specific contingency, and such passes are added to the processing pipeline.

Figure 8B:
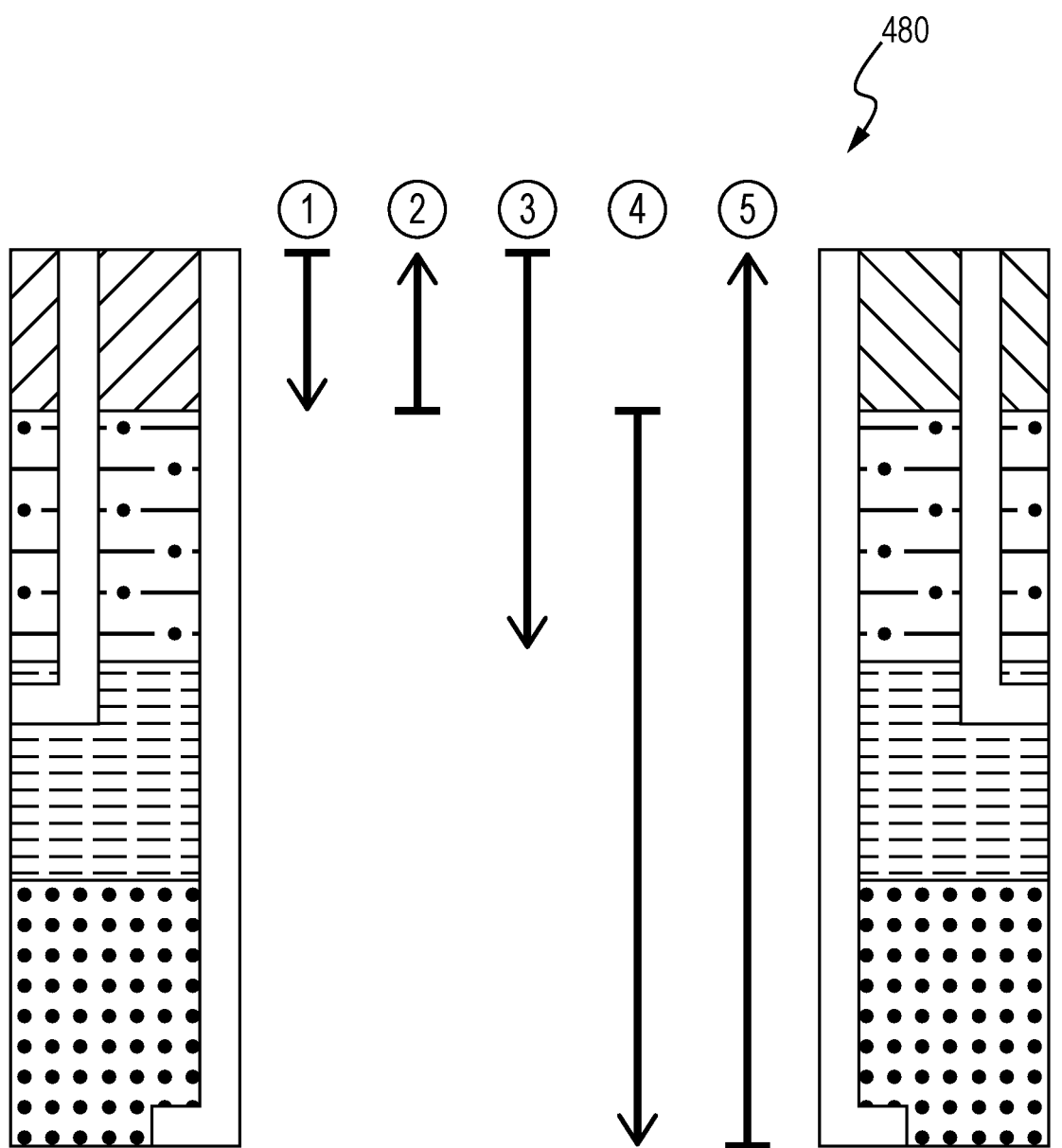

A schematic diagram of logging passes is provided at 480, on FIG. 8B. A first pass is illustrated starting proximal the top of the well and extending for a first region. The first pass is downward in this region and sensor data is collected on the pass. The second pass is illustrated in the first region and in the upward direction. The third pass is illustrated from proximal the top of the well and extending into a second region. In an example, the data may not be validated and then, according to a contingency plan, a fourth pass extends from the end of the third pass into a third region of the well.

A fifth pass may be conducted from the third region in an upward direction to a top of the well.

The DEP is not a fixed but adaptive sequence: it enables to customize the tool parameters in view of the results obtained in the wellbore and/or to perform additional operations/modifying a number of logging passes based on the acquisition or computation results and the domain quality control model and possibly the parametrization and/or well physics model. A DEP may be refined automatically at different stages of the plan and/or manually by a user situated at the well site or remotely.

The disclosed principles may be combined with a computing system to provide an integrated and practical application to achieve autonomous well integrity operations. For instance, the disclosed systems and methods improve client/user experience. As an example, system 400 may provide access (e.g., credential access) to a client, allow the client to locate an asset or assets associated with the oil field 200, and allow the client to identify or capture client objectives such as parameters of uncertainty, derisking elements, limiting uncertainty relative to and optimizing a well barrier, etc. In some instances, the client either may provide or select a customer model or may enter certain data that allow the system 400 to build a proxy model (e.g., by importing data from a preexisting well). The system may determine the client objectives such as uncertainty, and the client may make decisions based on the determined client objectives. As another example, system 400 may grant more flexibility to a client by allowing the client to look up (e.g., within the client's own database or knowledge base or from other sources available to the client) models or contextual information in order to plan optimal services that meet the client's objectives. A list of options (e.g., parameters, models, execution plans, etc.) may be created, ranked, and made available to the client to allow the client to make real-time, informed decisions on the choice of technologies and/or services (e.g., to add, remove, or change) in order for the client's objectives to be achieved. For example, if important information about a well barrier is missing from a current wellbore, a logging service may be performed in this wellbore. Oil field operations, for example, may be changed dynamically during data acquisition. The quicker response reduces or eliminates waste in time and resources associated with approaches where sensor data is acquired (without any real-time monitoring or feedback) and only analyzed at a delayed time. Now, with the integrated approach presented in this disclosure, sensor data may be updated (e.g., using an Evergreen model) that is regularly monitored to determine if results are as expected. Data acquisition may be changed in real-time if results are not as expected.

According to some implementations of system 400, products (e.g., candidate services) may be proposed and delivered in real-time with the aid of interpretation library 452 translating the candidate services and execution plans into consumable data such as result plots and other interpreted forms/interpreted results and presenting the consumable data (e.g., interpreted results) in real-time or pseudo-real-time via a collaboration dashboard accessible by one or more users simultaneously and/or via similar or dissimilar display devices and/or via user terminals associated with the respective users. This beneficially offers significant advantages over approaches where products/services are delivered only after advanced post-job analysis of data using other information available about the oil field 200 (e.g., wellsite and/or oil field). In some instances, whereas a manual process may take days to get to a reasonably accurate result, and the turnaround time of days may be too late for customers/users to make informed decisions on the wellsite while producing and maintaining the integrity of the wellbores at the resource, the systems and methods disclosed herein decrease, in some embodiments, the wait time to make such site planning decisions in a relatively short amount of time (e.g., 2-50 minutes, 1-2 hours, 1-8 hours, 1-12 hours, etc.)

System 400 has been described in relationship with acoustic logging tools. Well integrity services include other types of tools (such as electromagnetic tools and/or calipers) and the methods and systems described therein are applicable to such tools.

The current disclosure relates to a method for monitoring a well barrier of a wellbore formed in a geological formation at a resource site. The well barrier includes at least a casing and an annulus situated between the casing and the geological formation. The method comprises receiving a model of the wellbore including a plurality of wellbore model parameters respectively having wellbore model parameter values and/or wellbore model parameter uncertainties. The method also includes identifying at least one well integrity service to perform in the wellbore with a downhole tool. The well integrity service includes acquiring sensor data relative to a state of the well barrier. An execution plan, including a sequence of actions to perform the at least one well integrity service is then generated based on the at least one well integrity service. The execution plan is executed at the resource site, which includes controlling operation of one or more equipment, including the downhole tool, at the resource site to perform the at least one identified service. Based on the sensor data acquired at the resource site during the execution of the execution plan, the method includes updating the value and/or uncertainty of at least one of the wellbore model parameters, thereby updating the wellbore model and determining a state of the well barrier based on the updated wellbore model.

The well integrity service may include acquiring sensor data relative to a state of the well barrier using a predetermined (tool) parametrization. The tool parametrization may include a voltage includes a voltage, an intensity, a gain, acquisition filters, acquisition time windows.

In an embodiment, the downhole tool includes one or more wireline acoustic tools and acquiring sensor data includes acquiring one or more waveforms obtained in response to an emitted signal.

In an embodiment, executing the at least one well integrity service. includes interpreting the acquired sensor data to compute the one or more updated wellbore model parameter values and/or uncertainties. In particular, when the well integrity service includes an acoustic service, interpreting the data includes computing characteristics relative to the waveforms, including a travel time, amplitude, phase, decay, or spectra.

In an embodiment, the wellbore model includes at least one of a borehole fluid model, a casing model and an annulus model. The wellbore model may for instance include includes information regarding one or more of: wellbore profile, complete profile, borehole fluid properties, recent wellbore operations, annulus properties, a state of a casing, and a state of an annulus.

The method may include receiving an objective parameter associated with the state of the well barrier and computing an objective parameter value and objective parameter uncertainty using the wellbore model. The objective parameter is a function of at least one wellbore model parameter. The at least one well integrity service is then identified based on the wellbore model and on the objective parameter In an embodiment, identifying the at least one well integrity service includes simulating variation of the value and/or uncertainty of at least one of the wellbore model parameters according to one or more scenarios, and computing a forecasted objective parameter value and/or forecasted objective parameter uncertainty associated with each scenario. The at least one well integrity service is identified based on the forecasted objective parameter value and/or forecasted uncertainty associated with each scenario.

In an embodiment, identifying the at least one well integrity service includes determining whether the at least one well integrity service reduces the uncertainty of the objective parameter based on the forecasted objective parameter uncertainty associated with each scenario.

In particular, the method may include determining, based on at least a subset of the plurality of scenarios, sensitivity data regarding the respective contributions of the wellbore model parameters to the objective parameter; and identifying based on the sensitivity data, one or more target wellbore model parameters having high contributions to the objective parameter. The at least one well integrity service is identified based on the target wellbore model parameters. This may also be designated as a global sensitivity analysis.

In another embodiment, each scenario of at least a subset of the plurality of scenarios is representative of performance of an available service, and simulating the variation of the wellbore model parameters values and/or uncertainties according to said scenario includes incorporating data representative of the performance of an available service into the wellbore model. This has been described in more details in the specification also as forecast models. In this case, simulating the variation of the wellbore model parameters values and/or uncertainties according to said scenario is based on one or more equipment models, in particular the downhole tool for performing the available service. The equipment model may take into account one or more equipment parameters representative of one or more of accuracy, calibration and/or reliability of the equipment.

In another embodiment, the method comprises determining, based on a first subset of scenarios, sensitivity data regarding the respective contributions of the wellbore model parameters to the objective parameter and identifying based on the sensitivity data, one or more target model parameters. A plurality of candidate services are identified based on the target model parameters. The method comprises after that simulating the variation of the wellbore parameter values and/or uncertainties according to a second subset of scenarios. Each scenario of the second subset is representative of performance of one of the candidate service, and the simulation according to said scenario includes incorporating data representative of the performance of the available into the wellbore model. The at least one well integrity service is identified based at least on the forecasted objective parameter values and/or uncertainties associated with the second subset of scenarios.

The objective parameter may be an indicator of a casing corrosion, or of a composition of the annulus.

Identifying the at least one well integrity service may include presenting a set of recommended services to an user based on the forecasted objective parameter values and/or uncertainties associated with the plurality of scenarios. Each of the recommended services may be associated with additional information that includes one or more of the following: a price of the recommended service, and a description of the recommended service and possibly an indicator of an uncertainty associated with the objective parameter, for scenarios corresponding to the recommended services. The at least one effective service is selected from the set of recommended services by the user. In particular, a multi-factor logic may be used to identify and/or rank the recommended services.

In an embodiment, the at least one well integrity service is an at least one first well integrity service. The method may further include identifying an at least one second well integrity service to be performed in the wellbore based on the updated wellbore model, updating the execution plan to perform the at least one second well integrity service, and upon reception of the updated execution plan at the resource site, executing the updated execution plan. Naming the execution plan an initial execution plan, the execution plan may be updated during the execution of the initial execution plan.

The at least one first well integrity service may include acquiring sensor data using a set of downhole tools having a first predetermined parametrization and/or at a first pre-determined location set and the at least one second well integrity service may include acquiring sensor data using the set of downhole tools having a second predetermined param-etrization and/or at a second predetermined location set. Alternatively, the at least one second well integrity service may include using a different set of downhole tools than the set used for performing the first service.

In an embodiment, executing the execution plan includes performing a quality control based on the acquired sensor data. The quality control outputs a state that is determined as either acceptable or undesired by comparing a characteristic derived from the acquisition data with an expected charac-teristic. The automated quality control is performed based on a QC model included in the execution plan and includes the expected characteristic and/or acceptable and/or undesired state. The at least one wellbore model parameter may be updated based on the acquired sensor data when the auto-mated quality control outputs an acceptable state.

In an embodiment, the automated quality control includes controlling a quality of one or more acquisition parameter used during data acquisition. The acquisition parameters include one or more tool parameters, for instance selected from the group consisting of an acquisition time window, a gain, a filter, a voltage, and an intensity. If the at least one well integrity service includes an acoustic service, per-formed with one or more acoustic logging tools as men-tioned above, the data quality control may relate to wave-form integrity or signal-to-noise ratio.

When executing the execution plan includes interpreting the acquired sensor data to compute one or more updated wellbore model parameter values and/or uncertainties, the data quality control may include controlling a quality of one or more computation parameter used during data interpre-tation. In this case, the one or more computed wellbore model parameters values and/or uncertainties are computed taking into account on one or more predetermined wellbore model parameter. The quality control may include determin-ing change points in the computed wellbore model param-eter values and deriving change points in the one or more predetermined wellbore model parameter values. The derived change points for the one or more predetermined wellbore model parameter values are compared to expected change points. The one or more predetermined wellbore model parameters may be relative to borehole fluid and/or casing internal diameter and/or casing thickness. If the state of the quality control is undesired, at least one predeter-mined wellbore model parameters may be updated.

More generally, executing the execution plan comprises, in response to obtaining an undesired state from the quality control, performing a contingency plan that may include one or more of updating wellbore model parameters, updating a parametrization of the downhole tool, and updating the sequence of actions of the execution plan.

Each action of the sequence of the execution plan is associated with one or more preconditions, success condi-tions and failure conditions.

In an embodiment, the execution plan is generated remotely from the resource site on a set of one or more processors and is transmitted to the resource site for execu-tion at the resource site. At least one of the acquired sensor data and updated wellbore model parameter may transmitted from the resource site to the one or more computing system processors. A visualization representing the state of the well barrier may also be generated and presented to at least one end user on an end user terminal located at one or more locations, including at the resource site and a remote site.

When the method includes a quality control, the acquired sensor data and/or the at least one updated wellbore model parameter is transmitted from the resource site to the one or more computing system processors when the automated quality control outputs an acceptable state.

The disclosure also related to a system for monitoring a well barrier of a wellbore formed in a geological formation at a resource site. The well barrier includes at least a casing and an annulus situated between the casing and the geologi-cal formation. The system comprises one or more computing system processors configured for receiving a model of the wellbore including a plurality of wellbore model parameters each having at least one of wellbore model parameter value and associated uncertainty and generating an execution plan including a sequence of actions to perform at least one well integrity service based on the wellbore model. The at least one well integrity service includes acquiring sensor data relative to a state of the well barrier with a downhole tool. The one or more computing system processors is also configured to execute the execution plan at the resource site, wherein it includes controlling operation of one or more equipment, including the downhole tool, at the resource site to perform the at least one well integrity service. Further-more it is configured to update at least one of the value and associated uncertainty of at least one of the wellbore model parameters, thereby updating the wellbore model, based on the sensor data; and determining a state of the well barrier based on the updated wellbore model.

The one or more computing system processors may include a first subset of processors situated at the resource site and a second subset of processors situated remotely from the resource site. The second subset of processors generates the execution plan and the first subset of proces-sors executes the execution plan, and the second subset of processors is configured to transmit the execution plan to the first subset of processors. In this case, the first subset of processors may be configured to transmit at least one of the acquired sensor data and the at least one of updated wellbore model parameter value and associated uncertainty to the second subset of processors. The system may also include a user terminal situated remotely from the sets (i.e. first and second subsets) of server and comprising at least a user interface, and wherein the one or more computing system processors, in particular the second subset of processors is configured to transmit the state of the well barrier to the user terminal for presenting the state of the well barrier on the user terminal.

The system may also include the downhole tool and the one or more computing system processors is configured to communicate with the downhole tool for sending control commands and receiving data including the sensor data. The downhole tool may include an acoustic logging tool configured for emitting an acoustic signal in the wellbore and the sensor data may include waveforms received in response to the acoustic signal.

The system may comprise all of the necessary equipment to perform the claimed method and/or the method disclosed above. In particular, the one or more computing system processors may be configured to perform any embodiment of the method disclosed above.

The disclosure also relates to a method for performing at least one well integrity service in a wellbore formed in a geological formation at a resource site and having a well barrier including a casing and an annulus formed between the casing and the geological formation. The at least one well integrity service includes acquiring sensor data relative to the well barrier with one or more downhole tool situated in the wellbore. The method includes receiving an execution plan at the resource site, the execution plan including a sequence of actions to perform the at least one well integrity service, each action being associated with at least one of a failure condition and a success condition. It further includes executing the execution plan at the resource site, which includes controlling operation of one or more equipment comprising the one or more downhole tools to acquire the sensor data. Executing the execution plan includes providing data relative to the well barrier based on acquired sensor data, executing at least a first action in response to a success condition of the data provision, the at least first action including controlling the quality of the data relative to the well barrier, by comparing at least one characteristic derived from the data relative to the well barrier to an expected characteristic. The quality state is determined either as acceptable or undesirable. Executing the execution plan also includes executing at least a second action in response to obtaining acceptable quality state, and a third action in response to obtaining an undesirable quality state.

The execution plan may include at least one of a wellbore model including at least one of a value and an uncertainty of one or more predetermined wellbore parameters, and a parameterization model including at least acquisition parameter values for one or more equipment including the downhole tool. Executing the execution may include parametrizing the downhole tools as per the parametrization model to provide the data relative to the well barrier.

The execution plan includes updating at least one of the wellbore model and the parametrization model in response to an undesirable quality control state.

When providing the data relative to the well barrier includes acquiring sensor data in an at least one first target location, executing the execution plan may include acquiring sensor data in an at least one second target location in response to an undesirable quality control state, wherein the at least second target location is the same or distinct from the at least one first target location.

Controlling the quality of the data relative to the well barrier data uses a machine learning model that determines the quality of the data relative to the well barrier data based on historical data. The expected characteristic of the acquired sensor data may for instance be determined based on historical data.

In an embodiment, the quality control operation is performed based on a QC model included in the execution plan and including the expected characteristic.

In an embodiment, data relative to the well barrier is the sensor data and providing the data relative to the well barrier includes acquiring the sensor data using the downhole tool in at least one target location. The quality control operation may then include controlling a quality of one or more acquisition parameter used during sensor data acquisition, wherein the acquisition parameters include one or more downhole tool parameters, in particular selected from the group consisting of acquisition time window, a gain, a filter, a voltage, an intensity.

In an embodiment, executing the execution plan includes executing at least one third action in response to undesirable quality regarding one of the downhole tool parameters, wherein the third action comprises updating said downhole tool parameter.

Executing the execution plan may then include in response to an undesirable quality state, at least one of updating one or more downhole tool parameter and of acquiring sensor data in in an at least one second target location in response, wherein the at least second target location is the same or distinct from the at least one first target location In an embodiment, the at least one well integrity service includes an acoustic service performed with a downhole tool including at least one acoustic transducer configured to emit an acoustic signal, wherein the sensor data includes waveforms received in response to the emitted signal and the quality control relates to waveform integrity or signal-to-noise ratio.

In another embodiment, providing the data relative to the well barrier includes interpreting the acquired sensor data to compute at least one of a value and associated uncertainty of one or more wellbore model parameters of a wellbore model, wherein the data quality control includes controlling the quality of the computed at least one of a value and associated uncertainty of one or more wellbore model parameters.

In this case, the computed at least one of a value and associated uncertainty of one or more wellbore model parameters being a function of predetermined wellbore model parameters, controlling the quality of the computed at least one of a value and associated uncertainty of one or more wellbore model parameters includes determining change points in the computed wellbore model parameter values and deriving change points in the one or more predetermined wellbore model parameter values, wherein the derived change points for the one or more predetermined wellbore model parameter values are compared to expected change points. The one or more predetermined wellbore model parameters may be relative to at least one of the borehole fluid, the casing internal diameter and the casing thickness.

In response to obtaining undesirable quality state regarding the computed at least one value and associated uncertainty of one or more wellbore model parameters, executing the plan may include at updating one or more of the predetermined wellbore model parameters.

In response to an acceptable state of the computed at least one value and associated uncertainty of one or more wellbore model parameters, executing the execution plan may include at least one of transmitting the computed at least one value and associated uncertainty of one or more wellbore model parameters to a remote server, updating the wellbore model and determining a state of the well barrier.

In another embodiment, executing the execution plan includes acquiring the sensor data using the downhole tool in at least one target location. In response to a success condition of the data acquisition, executing the execution plan includes controlling the quality of the sensor data, by comparing at least a characteristic derived from the sensor data to an expected characteristic. The quality control outputs an acceptable or undesired state for the sensor data quality. In response to an acceptable state of the sensor data quality, executing the execution plan includes interpreting the acquired sensor data to compute at least one of a value and associated uncertainty of one or more wellbore model parameters, and, in response to a success condition of the computation, controlling the quality of the computed at least one of a value and associated uncertainty of one or more wellbore model parameters, by comparing at least a characteristic derived from the computed at least one of a value and associated uncertainty of one or more wellbore model parameters to an expected characteristic, wherein the quality control outputs an acceptable or undesired state for the computed parameters quality.

The disclosure also relates to a system for performing at least one well integrity service in a wellbore, where the wellbore is formed in a geological formation at a resource site and has a well barrier including a casing and an annulus formed between the casing and the geological formation. The at least one well integrity service includes using one more equipment to acquiring sensor data associated with the well barrier. The one or more equipment may include one or more downhole tools situated in the wellbore surface equipment (e.g. surface unit), and combinations thereof. The system includes one or more computing system processors configured to receive a model of the wellbore, select and/or receive at least one well integrity service to perform in a wellbore, generate an execution plan, receive an execution plan at the resource site, execute the execution plan at least in part at the resource site, update one or more values and associated uncertainties associated with wellbore model parameters, and determine a state of the well barrier based upon the updated wellbore model and data captured by one or more equipment. The execution plan may include a sequence of actions to perform the at least one well integrity service, wherein each action is associated with at least one of a failure variable and a success variable; and execute the execution plan, which includes controlling operation of one or more equipment comprising the one or more downhole tools to perform the sequence of actions of the execution plan. The sequence of actions includes at least: (1) capturing data associated with the well barrier, where the data is based on sensor data; (2) at least a first action in response to a success variable of the captured or acquired data, where the first action includes a quality control operation on the captured data, where the quality control operation compares at least one characteristic associated with the captured data to an expected characteristic, where the quality state data is determined either as an acceptable status or an undesirable status; (3) where the quality state data response is an acceptable status: at least a second action, and (4) where the quality state data response is an undesirable status: at least a third action.

The system may further include the downhole tool, and the set of one or more computing system processors may be configured to communicate with the downhole tool for sending control commands and receiving data including the sensor data. The downhole tool may include an acoustic logging tool configured for emitting an acoustic signal in the wellbore and the sensor data includes waveforms received in response to the acoustic signal.

The one or more computing system processors are configured to execute all of the features claimed in the corresponding method. It may control and communicate to all necessary equipment to execute the actions that are discussed herein.

The systems and methods described in this disclosure provide improvements in autonomous operations at resource sites such as oil and gas fields. The systems and methods described allow an ordered combination of new results in autonomous operations including well integrity operations. The systems and methods described cannot be performed manually in any useful sense. Simplified systems may be used for illustrative purposes, but it will be appreciated that the disclosure extends to complex systems with many constraints thereby necessitating new hardware-based processing system described herein. The principles disclosed may be combined with a computing system to provide an integrated and practical application to achieve autonomous operations in oil and gas fields.

These systems, methods, processing procedures, techniques, and workflows increase effectiveness and efficiency. Such systems, methods, processing procedures, techniques, and workflows may complement or replace conventional methods for identifying, isolating, transforming, and/or processing various aspects of data that is collected from a subsurface region or other multi-dimensional space to enhance flow simulation prediction accuracy.

A benefit of the present disclosure is that more effective methods for well integrity operations may be employed. While any discussion of or citation to related art in this disclosure may or may not include some prior art references, Applicant neither concedes nor acquiesces to the position that any given reference is prior art or analogous prior art.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the invention and its practical applications, to thereby enable others skilled in the art to use the invention and various embodiments with various modifications as are suited to the particular use contemplated.

What is claimed is:

1. A method for monitoring a well barrier of a wellbore formed in a geological formation at a resource site, wherein the well barrier includes at least a casing and an annulus situated between the casing and the geological formation, the method comprising:

receiving, using one or more computing system processors, a model of the wellbore, the model of the wellbore including a plurality of wellbore model parameters, and each wellbore model parameter having a wellbore parameter value and a wellbore parameter value uncertainty;

obtaining an objective parameter having an objective parameter value and an objective parameter uncertainty;

simulating, using the one or more computing system processors, variations of the plurality of wellbore model parameters according to a plurality of scenarios;

computing, using the one or more computing system processors, based on the variations of the plurality of wellbore model parameters, a forecast of the objective parameter associated with each of the plurality of scenarios;

determining, using the one or more computing system processors, sensitivity data regarding respective contributions of the plurality of wellbore model parameters to the objective parameter uncertainty based on the forecast;

identifying, using the one or more computing system processors, a plurality of candidate well integrity services based on the sensitivity data;

simulating, using the one or more computing system processors, variations of the plurality of wellbore model parameters corresponding to simulated performance of the plurality of candidate well integrity services;

computing, using the one or more computing system processors, based on the variations of the plurality of wellbore model parameters, a second forecast of the objective parameter associated with each of the plurality of candidate well integrity services;

ranking, using the one or more computing system processors, based on the second forecast of the objective parameter, the plurality of candidate well integrity services in order of the objective parameter uncertainty;

identifying, using the one or more computing system processors, based on the ranking, at least one recommended well integrity service, from the plurality of candidate well integrity services, that minimizes the objective parameter uncertainty, to perform in the wellbore with a downhole tool, wherein performing the at least one recommended well integrity service comprises capturing sensor data associated with the well barrier;

generating, using the one or more computing system processors, an execution plan comprising one or more operations including at least one operation associated with performing the at least one recommended well integrity service;

executing the execution plan at the resource site, wherein the execution plan includes a control operation of one or more equipment at the resource site;

updating at least one of the plurality of wellbore model parameters to generate an updated model of the wellbore; and determining a state of the well barrier based on the updated model of the wellbore.

2. The method of claim 1 wherein;

the downhole tool includes one or more acoustic logging tools; and acquiring sensor data includes acquiring one or more waveforms obtained in response to an emitted signal.

3. The method of claim 1, wherein;

the objective parameter is a function of at least one wellbore model parameter of the plurality of wellbore model parameters; and the objective parameter relates to a state of the well barrier.

4. The method of claim 1, wherein the objective parameter is an indicator of a casing corrosion or is an indicator of a composition of the annulus.

5. The method of claim 1, wherein the model of the wellbore includes at least one of: a borehole fluid model, a casing model, or an annulus model.

6. The method according to claim 1, further comprising:

identifying, using the one or more computing system processors, at least one second well integrity service to perform in the wellbore based on the updated model of the wellbore;

updating, using the one or more computing system processors, the execution plan to include at least one operation associated with performing the at least one second well integrity service; and executing the updated execution plan at the resource site.

7. The method of claim 1, wherein the control operation includes acquiring, using the one or more computing system processors, sensor data relative to the state of the well barrier.

8. The method of claim 7, further comprising:

interpreting the acquired sensor data; and computing a wellbore parameter value and a wellbore parameter uncertainty of the at least one updated wellbore parameter.

9. The method of claim 7, further comprising transmitting, using the one or more computing system processors, the execution plan from a remote server to the resource site.

10. The method of claim 7, further comprising transmitting, using the one or more computing system processors, at least one of the acquired sensor data or the updated model of the wellbore from the resource site to one or more remote end user terminals.

11. The method of claim 10, further comprising generating, using the one or more computing system processors, a visualization representing the state of the well barrier on the one or more end user terminals located remote from the resource site.

12. The method of claim 7, wherein executing the execution plan includes performing a quality control operation comprising comparing, using the one or more computing system processors, a characteristic associated with the acquired sensor data with an expected characteristic to generate a quality state, the quality state having one of an acceptable status and an undesirable status.

13. The method of claim 12, wherein performing the quality control operation further comprises updating, using the one or more computing system processors, the at least one wellbore model parameter in response to the quality state having the acceptable status.

14. The method of claim 12, wherein the comparing is based at least on a quality control model, wherein the quality control model is included in the execution plan, and wherein the quality control model includes at least one of the expected characteristic, the acceptable status, or the undesirable status.

15. The method of claim 12, wherein:

the downhole tool includes one or more acoustic logging tools;

the acquired sensor data includes one or more waveforms obtained in response to an emitted signal; and the quality control operation relates to waveform integrity or signal-to-noise ratio.

16. The method of claim 12, wherein in response to the quality state having an undesirable status, the quality control operation further comprises at least one of:

updating at least one of the plurality of wellbore model parameters;

updating a parametrization of the downhole tool; or updating a sequence of the one or more operations of the execution plan.

17. The method of claim 1, wherein each operation of the one or more operations of the execution plan includes one or more actions, and wherein each of the one or more actions is associated with one or more preconditions, one or more success conditions, and one or more failure conditions.

18. The method of claim 1, wherein the execution plan is generated based on a parametrization model, the parametrization model including a parametrization of one or more equipment at the resource site, the one or more equipment including the downhole tool.

19. A system for monitoring a well barrier of a wellbore formed in a geological formation at a resource site, wherein the well barrier includes at least a casing and an annulus situated between the casing and the geological formation, the system comprising:

one or more computing system processors; and memory storing instructions that are executable by the one or more computing system processors to:

receive a wellbore model of the wellbore, the model of the wellbore including a plurality of wellbore model parameters, and each wellbore model parameter having a wellbore parameter value and a wellbore parameter value associated uncertainty;

obtain an objective parameter having an objective parameter value and an objective parameter uncertainty;

obtain an objective parameter having an objective parameter value and an objective parameter uncertainty;

simulate variations of the plurality of wellbore model parameters according to a plurality of scenarios;

compute, based on the variations of the plurality of wellbore model parameters, a forecast of the objective parameter associated with each of the plurality of scenarios;

determine sensitivity data regarding respective contributions of the plurality of wellbore model parameters to the objective parameter uncertainty based on the forecast;

identify a plurality of candidate well integrity services based on the sensitivity data;

simulate variations of the plurality of wellbore model parameters corresponding to simulated performance of the plurality of candidate well integrity services;

compute based on the variations of the plurality of wellbore model parameters, a second forecast of the objective parameter associated with each of the plurality of candidate well integrity services;

rank, based on the second forecast of the objective parameter, the plurality of candidate well integrity services in order of the objective parameter uncertainty;

identify, based on the ranking, at least one recommended well integrity service, from the plurality of candidate well integrity services, that minimizes the objective parameter uncertainty, to perform in the wellbore with a downhole tool, wherein performing the at least one recommended well integrity service comprises capturing sensor data associated with the well barrier;

generate, based on the model of the wellbore, an execution plan including one or more actions to perform the at least one recommended well integrity service, wherein performing the at least one well recommended integrity service includes acquiring sensor data relative to a state of the well barrier with a downhole tool;

execute the one or more actions included in the execution plan at least in part at the resource site, wherein executing the one or more actions includes performing control operations of one or more equipment at the resource site;

update at least one of the plurality of wellbore model parameters to generate an updated model of the wellbore; and determine a state of the well barrier based on the updated model of the wellbore.

20. The system of claim 19, wherein;

the one or more computing system processors comprises one or more first system processors positioned at the resource site and configured to receive the execution plan; and control one or more equipment at the resource site according to the one or more actions; and the one or more system processors further comprises one or more second system processors positioned remotely from the resource site and configured to:

generate the execution plan; and transmit the execution plan.

21. The system of claim 20, wherein:

the one or more first system processors are further configured to transmit at least one of the acquired sensor data or the at least one updated wellbore model parameter to the one or more second system processors;

the system further comprises a user terminal situated remotely from a first subset of servers and a second subset of servers and comprising at least a user interface;

the second subset of servers is configured to transmit the state of the well barrier to the user terminal; and the user terminal is configured to present the state of the well barrier on the user interface.

22. The system of claim 19, wherein:

the one or more computing system processors is configured to communicate with the downhole tool for sending control commands and receiving data including the sensor data;

the downhole tool includes an acoustic logging tool configured for emitting an acoustic signal in the wellbore;

the sensor data includes waveforms received in response to the acoustic signal;

updating at least one of the plurality of wellbore model parameters to generate an updated model of the wellbore; and determining a state of the well barrier based on the updated model of the wellbore.

23. The method of claim 13, wherein:

the objective parameter is input by a user;

the recommended well integrity service is provided to the user with a rationale explaining why the recommended well integrity service meets the objective parameter;

the ranking is further based on multi-factor ranking logic considering at least one of: suitability, effectiveness, cost, availability, or efficiency of the well integrity service candidates to achieve the objective parameter in an operating environment of the wellbore, the operating environment including at least one of: borehole fluid attenuation, pipe thickness, pipe diameter, or signal to noise ratio; and the plurality of candidate well integrity services comprises at least one of: zonal isolation, casing cut and pull, pipe inspection, or cement evaluation.

* * * * *